United States Patent [19]

Masuda et al.

[11] Patent Number: 5,748,621

[45] Date of Patent: May 5, 1998

[54] DIGITAL MOBILE COMMUNICATION SYSTEM

[75] Inventors: Atsushi Masuda, Sagamihara; Takahiro Endo, Hachiouji, both of Japan

[73] Assignee: Kabushiki Kaisha Toshiba, Kawasaki, Japan

[21] Appl. No.: 613,264

[22] Filed: Mar. 8, 1996

[30] Foreign Application Priority Data

Mar. 10, 1995 [JP] Japan ................. 7-051393
Mar. 10, 1996 [JP] Japan ................. 7-051394

[51] Int. Cl.$^6$ ................. H04B 7/212
[52] U.S. Cl. ................. 370/337; 370/350; 455/452; 455/502
[58] Field of Search ................. 455/34.1, 51.1, 455/54.1, 54.2, 450, 452, 502, 517; 379/61, 63; 370/328, 329, 336, 337, 350, 509; 340/825.47

[56] References Cited

U.S. PATENT DOCUMENTS

| | | | |
|---|---|---|---|
| 5,355,529 | 10/1994 | Lindquist et al. | 455/51.1 |
| 5,363,373 | 11/1994 | Nakahara et al. | 370/350 |
| 5,430,724 | 7/1995 | Fall et al. | 370/337 |
| 5,517,675 | 5/1996 | O'Connor et al. | 455/51.1 |
| 5,535,207 | 7/1996 | Dupont | 455/34.1 |

*Primary Examiner*—Benedict V. Safourek
*Attorney, Agent, or Firm*—Finnegan, Henderson, Farabow, Garrett & Dunner, L.L.P.

[57] ABSTRACT

In a digital mobile communication system comprising a cell station and a plurality of personal stations and employing a TDMS-TDD method, a personal station which is going to originate a call in a transceiver mode detects a unique word contained in a signal being transmitted from a control slot or communication slot by a busy personal station or cell station, recognizes the timing of the receiving slot and the receiving frame in view of the position of the unique word and controls to synchronize the timing of its own slot and frame with the aforementioned timing. A personal station which is to start a personal station-to-personal station direct communication can determine a communication slot after establishing complete synchronization with the busy personal station or cell station, and can improve the efficiency of using a frequency by eliminating time when a communication cannot be made.

9 Claims, 20 Drawing Sheets

FIG.3 RELATION BETWEEN FREQUENCY BAND AND CARRIER NUMBER

| CARRIER NO. | FREQUENCY (MHz) | USE | CARRIER NO. | FREQUENCY (MHz) | USE |
|---|---|---|---|---|---|
| 1 | 1895.150 | FOR SELF-EMPLOYED BUSINESS, FOR PERSONAL STATION-TO-PERSONAL STATION DIRECT TALKING, AND FOR COMMUNICATION COMMONLY USED FOR OUTDOOR PUBLIC LINE (SEE NOTES) | 38 | 1906.250 | FOR COMMUNICATION COMMONLY USED FOR OUTDOOR PUBLIC LINE (SEE NOTES) |
| 2 | 450 | | 39 | 550 | |
| 3 | 750 | | 40 | 850 | |
| 4 | 1896.050 | | 41 | 1907.150 | |
| 5 | 350 | | 42 | 450 | |
| 6 | 650 | | 43 | 750 | |
| 7 | 950 | | 44 | 1908.050 | |
| 8 | 1897.250 | | 45 | 350 | |
| 9 | 550 | | 46 | 650 | |
| 10 | 850 | | 47 | 950 | |
| 11 | 1898.150 | FOR SELF-EMPLOYED BUSINESS, FOR COMMUNICATION COMMONLY USED FOR OUTDOOR PUBLIC LINE (SEE NOTES), AND FOR CONTROL OF SELF-EMPLOYED BUSINESS LINE | 48 | 1909.250 | |
| 12 | 450 | | 49 | 550 | |
| 13 | 750 | | 50 | 850 | |
| 14 | 1899.050 | FOR SELF-EMPLOYED BUSINESS, AND FOR COMMUNICATION COMMONLY USED FOR OUTDOOR PUBLIC LINE (SEE NOTES) | 51 | 1910.150 | |
| 15 | 350 | | 52 | 450 | |
| 16 | 650 | | 53 | 750 | |
| 17 | 950 | | 54 | 1911.050 | |
| 18 | 1900.250 | FOR CONTROL OF SELF-EMPLOYED BUSINESS LINE | 55 | 350 | |
| 19 | 550 | | 56 | 650 | |
| 20 | 850 | | 57 | 950 | |
| 21 | 1901.150 | | 58 | 1912.250 | |
| 22 | 450 | | 59 | 550 | |
| 23 | 750 | | 60 | 850 | |
| 24 | 1902.050 | FOR SELF-EMPLOYED BUSINESS, AND FOR COMMUNICATION COMMONLY USED FOR OUTDOOR PUBLIC LINE (SEE NOTES) | 61 | 1913.150 | |
| 25 | 350 | | 62 | 450 | |
| 26 | 650 | | 63 | 750 | |
| 27 | 950 | | 64 | 1914.050 | |
| 28 | 1903.250 | | 65 | 350 | |
| 29 | 550 | | 66 | 650 | |
| 30 | 850 | | 67 | 950 | |
| 31 | 1904.150 | | 68 | 1915.250 | |
| 32 | 450 | | 69 | 550 | |
| 33 | 750 | | 70 | 850 | |
| 34 | 1905.050 | | 71 | 1916.150 | |
| 35 | 350 | | 72 | 450 | |
| 36 | 650 | | 73 | 750 | |
| 37 | 950 | | 74 | 1917.050 | |
| | | | 75 | 350 | |
| | | | 76 | 650 | |
| | | | 77 | 950 | |

(NOTES) — CARRIER FOR CONTROLLING OUTDOOR PUBLIC LINE OF ONE WAVE OR MORE MAY BE INCLUDED.
- - -→ CONTROL CHANNEL FOR OUTDOOR PUBLIC LINE HAS NOT BEEN DETERMINED YET.
- SELF-EMPLOYED BUSINESS LINE INCLUDES BUSINESS AND HOME LINES.

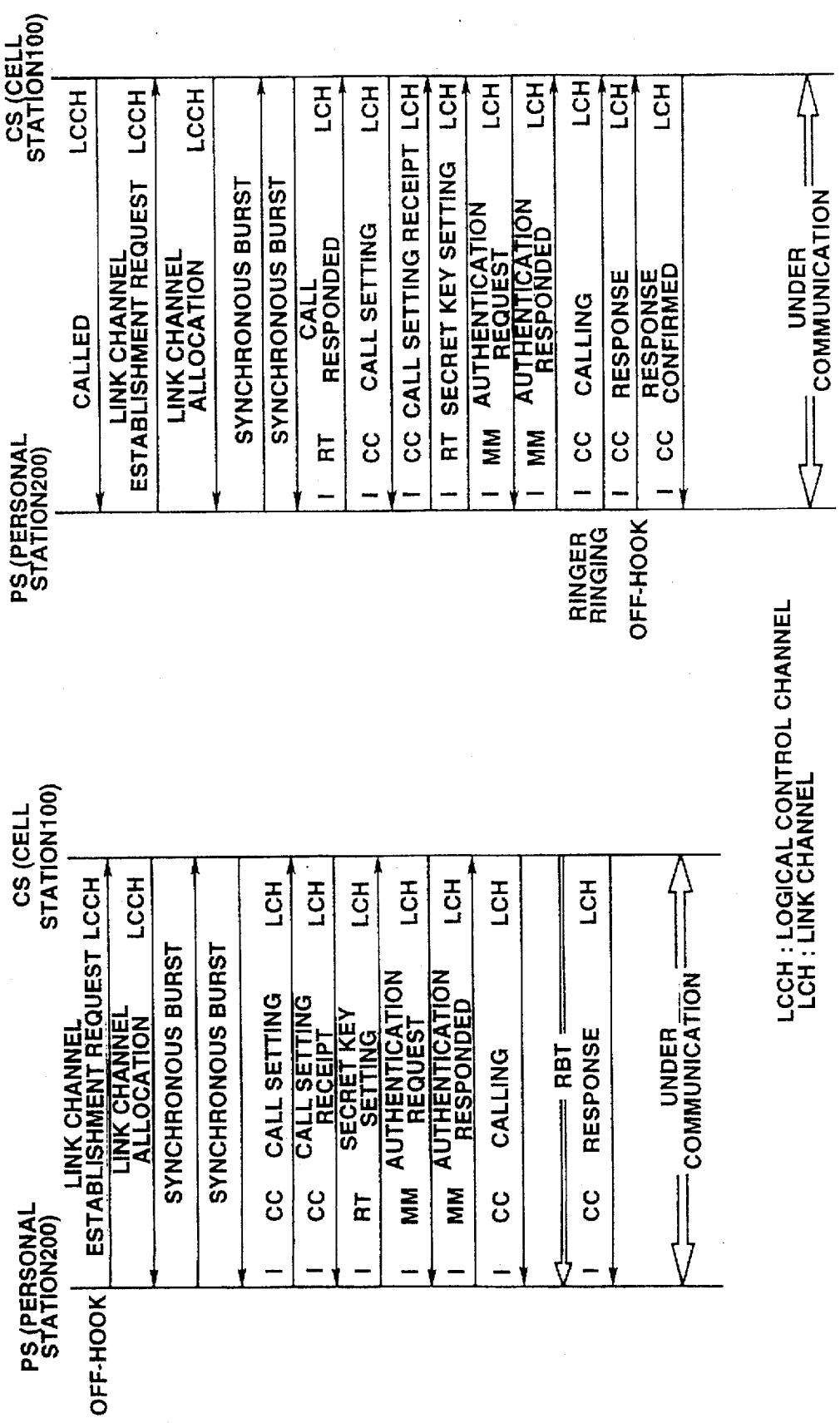

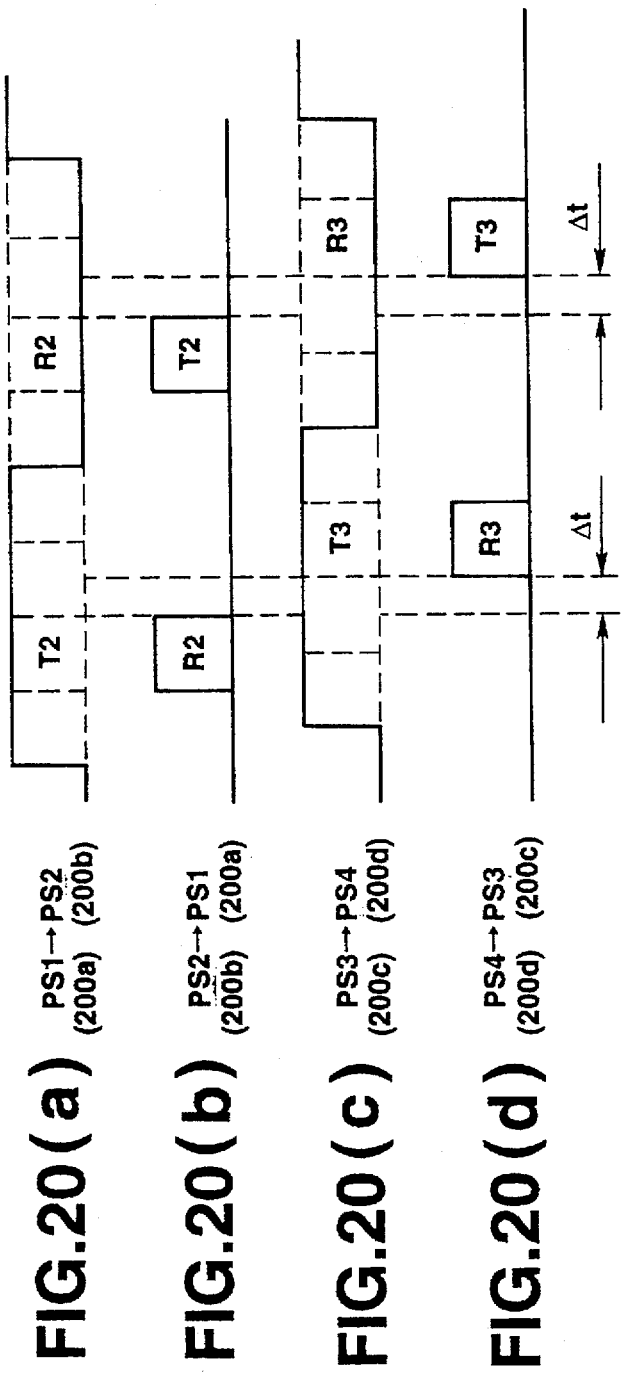

DIGITAL MOBILE COMMUNICATION SYSTEM

BACKGROUND OF THE INVENTION

1. Field of the Invention

The invention relates to a digital mobile communication system in a time division multiple access (TDMA) method comprising a plurality of cell stations and a plurality of personal stations for wireless communications with the cell stations, and particularly to a method of setting a communication slot associated with direct communications between the personal stations in a personal station-to-personal station direct communication mode (hereinafter referred to as the transceiver mode) without through the medium of the cell stations and to a method of realizing an extension transfer or broadcast address paging function using the transceiver mode.

2. Description of the Related Art

A known digital mobile communication system which comprises a plurality of cell stations and a plurality of personal stations for wireless communications with the cell stations uses a TDMA-TDD (Time Division Duplex) method as a method for effectively using a frequency.

FIG. 17 is a schematic structural view of such a type of digital mobile communication system, and particularly of a wireless communication between one cell station (CS) 100 and four personal stations (PS1 to PS4) 200a to 200d by the TDMA-TDD method.

FIG. 18 shows one example of the configuration of a time slot associated with communications between the above cell station CS and the personal stations PS1 to PS4 in the system of FIG. 17. Specifically, to communicate between the cell station CS and the personal stations PS1 to PS4 in this system, the cell station CS having received a communication request allocates any one of four transmission slots (T1 to T4) and four receiving slots (R1 to R4) disposed in one frame period of 5 ms to enable the realization of communications by the time division multiple accessing as shown in FIG. 18(a).

In this case, as to the personal stations PS1 to PS4, the personal station PS1 communicates with the cell station CS by using the transmission slot T1 of the cell station CS to receive and the receiving slot R1 of the cell station CS to transmit as shown in FIG. 18(b).

Similarly, to communicate with the cell station CS, the personal stations PS2, PS3 and PS4 use the transmission slots T2, T3 and T4 of the cell station CS to receive and the receiving slots R2, R3 and R4 of the cell station CS to transmit as shown in FIG. 18(c), (d) and (e).

On the other hand, FIG. 19 shows a direct communication between two pairs of personal stations or between PS1 and PS2 and between PS3 and PS4 in the above digital mobile communication system.

And, FIG. 20 shows the configuration of a time slot where the personal station PS1 and the personal station PS2 have started to communicate directly earlier than the personal station PS3 and the personal station PS4 do in the above personal station-to-personal station direct communication.

In this case, to communicate between a personal station 200a and a personal station 200b, the personal station PS1 uses the transmission slot T2 of the timing of the personal station PS1 to transmit and the receiving slot R2 to receive, and the personal station PS2 synchronizes with the timing of the personal station PS1 to receive with the timing of the transmission slot T2 and transmits with the timing of the receiving slot R2 of the personal station PS1 as shown in FIG. 20(a) and (b).

Subsequently, to communicate between the personal station PS3 and the personal station PS4, the personal station PS3 uses the transmission slot T3 with the timing of the personal station PS3 to transmit and the receiving slot R3 to receive, and the personal station PS4 synchronizes with the timing of the personal station PS3 to receive with the timing of the transmission slot T3 and transmits with the timing of the receiving slot R3 of the personal station PS3 as shown in FIG. 20(c) and (d).

For the personal station-to-personal station direct communication under such operating conditions, in a conventional digital mobile communication system, the personal station-to-personal station direct communication is designed to be started by determining the transmitting/receiving timing by the calling personal station PS1 and synchronizing with the timing of the calling personal station by the personal station PS2, so that when the personal station-to-personal station direct communication is simultaneously performed by a plurality of sets of personal stations, time Δt in which a communication cannot be made because it is shorter than the communication slot is generated as shown in FIG. 20(d). As a result, the 4 multiplex communication cannot be performed, resulting in heavily deteriorating the efficiency of using a frequency.

And, such a system supports an extension transfer function by which a certain busy personal station transmits its communication to another personal station depending on the type of a cell station and a broadcast address paging function by which a certain personal station pages all of other personal stations to transmit the same talking contents. But, to use such functions, all communications between a transferring personal station and a transferred personal station or between a multiaddress calling personal station and a multiaddress called personal station are performed through the cell station.

For example, when the extension transfer is performed by the conventional system, to talk from a transferring personal station to a transferred personal station, one slot each is allocated to an uplink from the transferring personal station and a downlink to the transferred personal station, temporarily though. Thus, two slots are occupied. Therefore, with a frame structure in that there are four slots for one radio to communicate with the cell station, when three other personal stations are busy, a vocal transfer notice cannot be transferred, resulting in disabling to make the extension transfer.

Similarly, to perform the broadcast address paging, one slot is used as an uplink from a calling personal station and another slot is used as a downlink to a plurality of called personal stations, thus two slots are occupied. Therefore, the broadcast address paging cannot be made when three other slots are busy.

Accordingly, the above conventional system occupies two speaking slots of a master device to make the extension transfer or broadcast address paging, so that the speaking slots are wasted when such service functions are used, resulting in deteriorating the efficiency of using a frequency.

SUMMARY OF THE INVENTION

An object of the invention is to provide a digital mobile communication system which can synchronize timings to start a personal station-to-personal station direct communication, and can improve the efficiency of using a frequency by eliminating time when communications cannot be made.

Another object of the invention is to provide a digital mobile communication system which can effectively use speaking slots and smoothly use the extension transfer function or broadcast address paging function while accommodating a large number of personal stations as many as possible.

To accomplish the above objects, the invention provides a digital mobile communication system comprising a plurality of cell stations and a plurality of mobile stations for wireless communications with the cell stations in a time division multiple access (TDMA) method which has a master-slave mode to communicate between the cell station and the mobile stations and a mobile station-to-mobile station direct communication mode (transceiver mode) to directly communicate between the mobile stations without through the cell station, wherein to start the mobile station-to-mobile station direct communication with another mobile station, the mobile stations detect a pattern and a signal level of a signal being transmitted by a busy mobile station or by the cell station to synchronize with the busy mobile station or cell station, and determines a communication slot to be used for the mobile station-to-mobile station direct communication.

In the invention, the mobile stations preferably have two modes, a master mode and a slave mode, for a call starting procedure in the transceiver mode, determine a communication slot with its own timing in the master mode to start the mobile station-to-mobile station direct communication, and in the slave mode detect the pattern and signal level of a signal being transmitted by a mobile station or the cell station to synchronize with the busy mobile station or cell station which is transmitting a channel selected to be used, synchronize with the busy mobile station or cell station, and determine a communication slot to be used to start the mobile station-to-mobile station direct communication.

And, in the invention, a signal to be detected is a unique word contained in a signal transmitted from a control slot or communication slot by the busy mobile station or cell station.

Besides, in the invention, the mobile stations are provided with hold request sending means for sending a hold request added with a hold call number to the cell station when a talking call is extension transferred via an associated cell station in the master-slave mode, hold call number noticing means for noticing the hold call number to a transferred mobile station in the transceiver mode after the call is held by the hold request, and calling means for originating a call to an associated cell station with the hold call number added after receiving the notice from the hold call number noticing means, wherein the cell station comprises hold control means for holding a call from the busy mobile station upon a hold request from the transferring mobile station and connection control means for connecting the held call to the transferred mobile station on condition that the hold call number agrees with a held call number already noticed by the transferring mobile station when the call with the hold call number added is received from the transferred mobile station, and uses the transceiver mode to effect the extension transfer.

Furthermore, in the invention, the mobile stations comprise simultaneous paging message sending means for sending a simultaneous paging message in the transceiver mode to effect broadcast address paging to other multiple mobile stations and waiting control means for setting a receiving mode and waiting to receive when the simultaneous paging message is received, and use the transceiver mode to make the broadcast address paging.

In the above structure of the invention, when another mobile station starts another mobile station-to-mobile station direct communication in a state that communications are being made in the same communication area, this mobile station detects the pattern and signal level of a signal being transmitted by a busy mobile station or cell station to synchronize with the busy mobile station or cell station and determines a communication slot to be used for the mobile station-to-mobile station direct communication, so that the communication slot for the mobile station-to-mobile station direct communication can always be set with accurate timing without being affected by fading or the like, and multiple access can be made at the same frequency without producing time when communications cannot be made.

And, to make the extension transfer in the invention, a hold request with a given hold call number added is sent from a transferring mobile station to hold a call in progress, the transceiver mode is effected by a prescribed operation, and a transferred mobile station is directly called in this mode to notice the transfer and the hold call number for the transfer. Then, when a mobile station is called by the transferred mobile station with the hold call number, which was noticed by the transferring mobile station, added, the cell station which has received the notice connects the held call to the transferred mobile station on condition that the hold call number agrees with the hold call number, which has been noticed by the transferring mobile station, to provide a communicable state.

Besides, to effect the broadcast address paging in the invention, a calling mobile station effects the transceiver mode by a prescribed operation, sends a "simultaneous paging" message in this mode to a plurality of called mobile stations and vocally informs the multiple address contents after a prescribed period, while the called mobile station receives the "simultaneous paging" message, enters the receiving mode to wait for the above prescribed period, and receives the multiple address contents being sent during the prescribed period from the calling mobile station.

Thus, the invention realizes the extension transfer or broadcast address paging in the transceiver mode, so that the required speaking slot is one, and can maximize the efficiency of using the speaking slot in the limitation of four speaking slots for one radio, resulting in enabling to increase the number of personal stations which can be accommodated by the one radio.

BRIEF DESCRIPTION OF THE DRAWINGS

FIG. 3 is a table showing the relation between frequencies and carrier numbers used in the system according to the invention;

FIGS. 4(a) and 4(b) are communication control sequences in a master-slave mode in the system according to the invention;

FIGS. 20(a) to 20(d) show a diagram illustrating an example of setting a time slot in a transceiver mode of a conventional digital mobile communication system.

DESCRIPTION OF THE PREFERRED EMBODIMENTS

Figure 1:
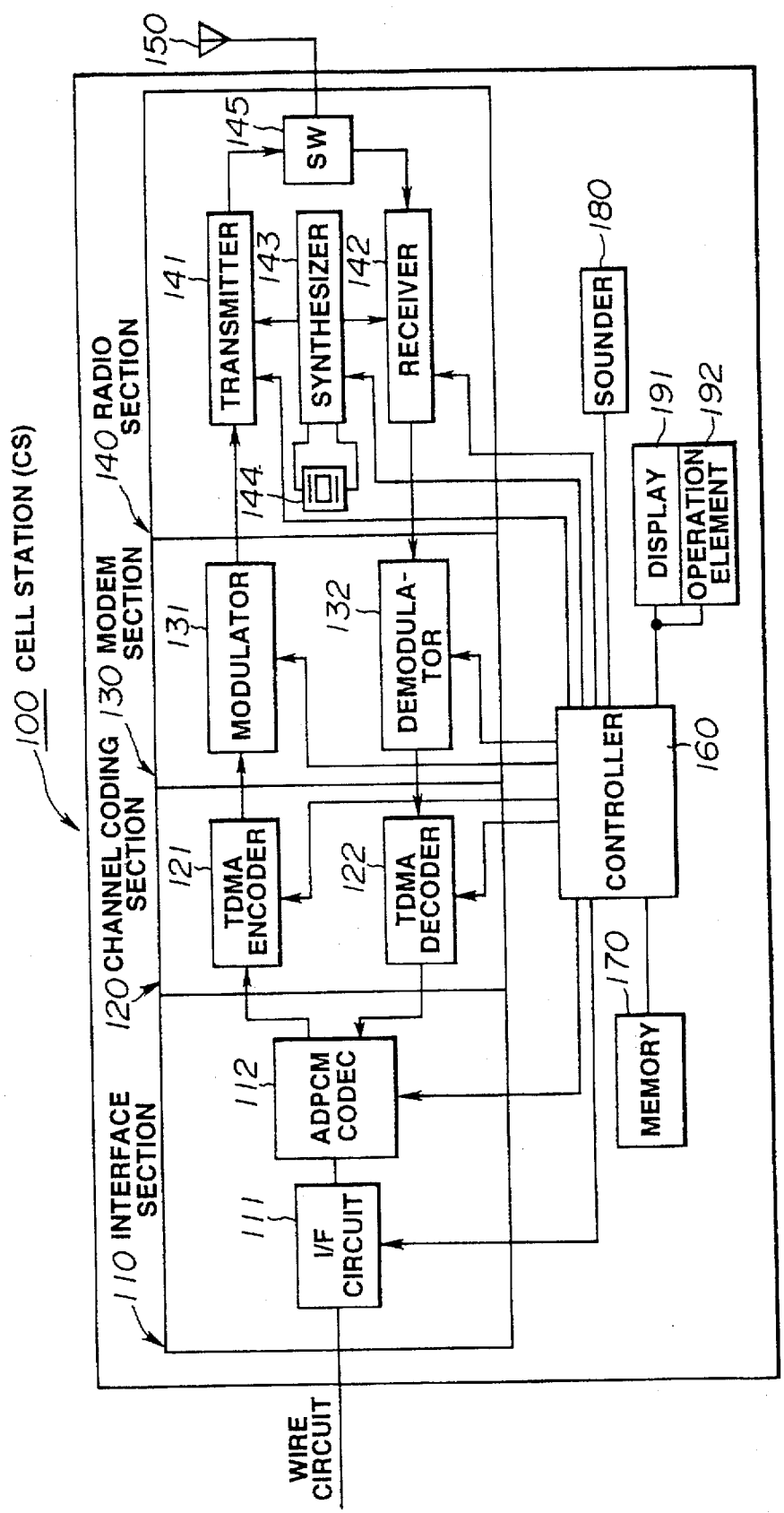
FIG. 1 is a block diagram showing the structure of a cell station in the digital mobile communication system according to the invention.
Figure 2:
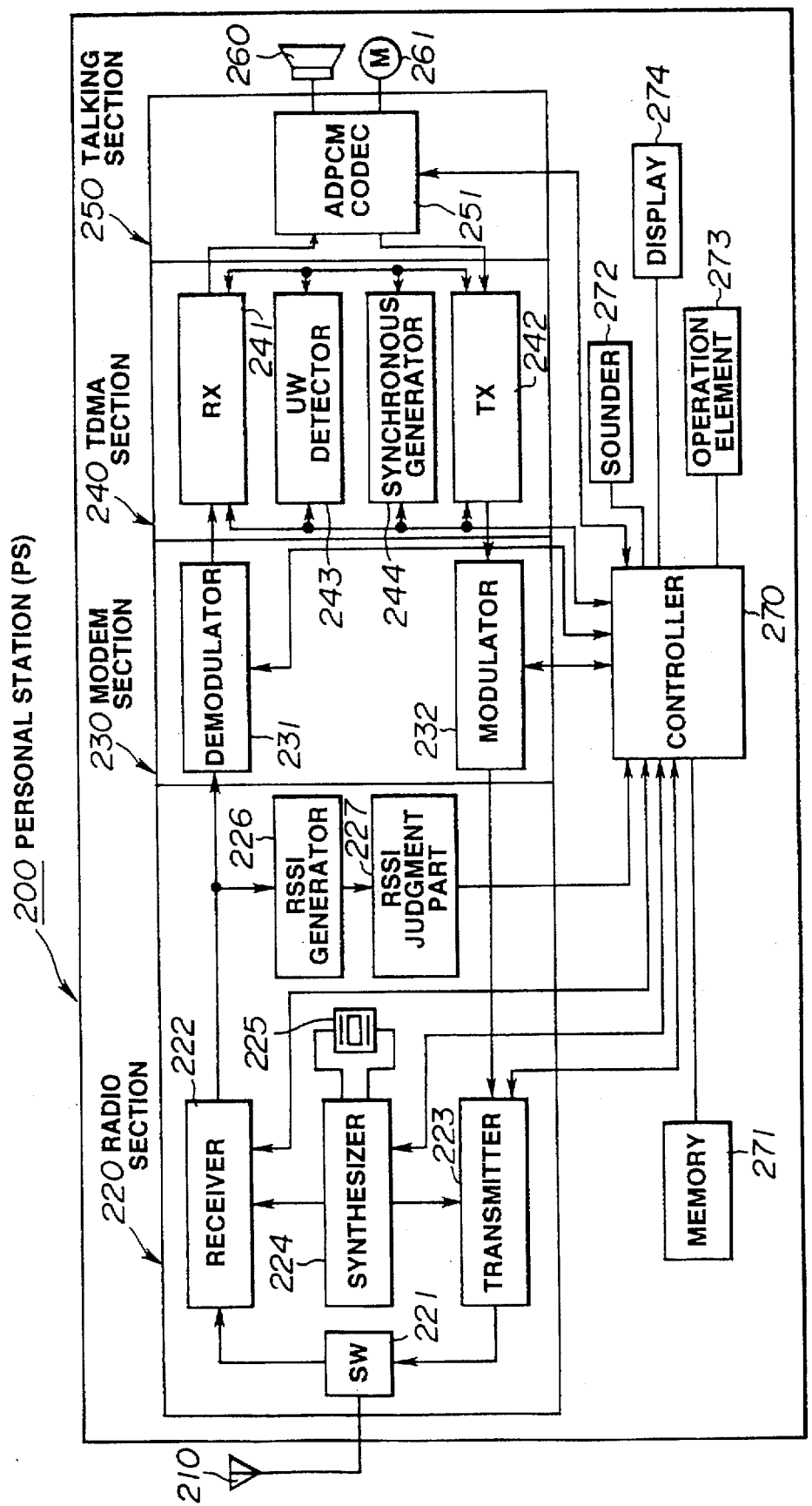
FIG. 2 is a block diagram showing the structure of a mobile station (personal station) in the system according to the invention.

Embodiments of the invention will be described in detail with reference to the accompanying drawings. FIG. 1 is a block diagram showing the schematic structure of a cell station in the digital mobile communication system according to the invention. FIG. 2 is a block diagram showing the schematic structure of a mobile station in the same system according to the invention.

In FIG. 1, a cell station 100 comprises an interface section 110 for interfacing with a wire circuit, a channel coding section 120 to effect encoding and decoding treatments for time division multiple accessing, a modem section 130 for modulating a transmitting signal and demodulating a received signal, a radio section 140 for transmitting and receiving a modulated signal, an antenna 150 for transmitting and receiving a radio signal, a controller 160 for generally controlling the above elements, a memory 170 for storing controlling data and the like, a sounder 180 for issuing a ringing tone or the like, a display 191 for showing various types of information, and an operation element 192 for entering various types of information such as an operation command.

Among the above elements, the interface section 110 includes an interface (I/F) circuit 111 for interfacing with a wire circuit to which the cell station 100 is connected and an ADPCM (Adaptive Pulse Code Modulation coadic 112 which is a decoding device of an adaptive differential pulse code modulating method which uses the redundancy of an aural signal to effect audio encoding with a less delay by a simple treatment while keeping speech quality according to linear prediction of the aural signal.

The channel coding section 120 includes a TDMA encoder 121 for encoding the aural signal from the ADPCM coadic 112 to a transmission slot and a TDMA decoder 122 for effecting a decoding treatment for the time division multiple accessing to take an own slot signal from demodulated serial data from a demodulator 132.

The modem section 130 includes a modulator 131 which modulates serial data from the TDMA encoder 121 and outputs, and the demodulator 132 which detects to demodulate a modulated signal received from a receiver 142 and outputs as serial data.

The radio section 140 includes a transmitter 141 which modulates a modulated signal from the modulator 131 with a carrier signal from a synthesizer 143 and transmits it through a transmit/receive switch 145, a receiver 142 which makes a harmonic channel selection of a radio signal received by the antenna 150 from a personal station 200, converts that signal into an intermediate frequency with the carrier signal from the synthesizer 143 and output it, the synthesizer 143 which synthesizes the carrier signal from an oscillating signal from a crystal oscillator 144 and outputs it, and the transmit/receive switch 145 which switches the antenna 150 for the receiver 142 and the transmitter 141 according to a transmit/receive control signal from the controller 160.

The controller 160 comprises a microprocessor and controls the whole device. The controller 160 is connected to the memory 170 for storing information for controlling, a program and abbreviated dial numbers, the sounder 180 for producing a ringing tone or the like, the display 191 for showing a screen required for communication and dial numbers, and the operation element 192 for operating the device including a key dial operation.

The digital mobile communication system according to the invention is applicable to cordless telephone systems for home and business uses, and particularly when applied to the latter, the system does not always need the sounder 180, the operation element 191 and the display 192 if the cell station 100 performs for switched connection only and the cell station 100 does not need to communicate with the personal station 200.

In FIG. 2, the mobile station 200 includes an antenna 210 for transmitting and receiving a radio signal, a radio section 220 for transmitting and receiving a modulated signal, a modem section 230 for modulating a transmitting signal and demodulating a received signal, a TDMA section 240 to effect encoding and decoding treatments for time division multiple accessing, a talking section 250 for encoding/decoding of a speaking aural signal, a speaker 260 for reproducing a speaking aural signal, a microphone 261 for collecting a voice, a controller 270 for generally controlling the above elements, a memory 271 for storing controlling data and the like, a sounder 272 for issuing a ringing tone to notice a incoming call, an operation element 273 for entering various types of information such as an operation command, and a display 274 for showing various types of information.

Among the above elements, the radio section 220 includes a transmit/receive switch 221 which switches the antenna 210 for a receiver 222 or a transmitter 223 according to a transmit/receive control signal from the controller 270, the receiver 222 which makes a harmonic channel selection of radio signal received by the antenna 210 from the cell station 100, converts that signal into an intermediate frequency with the carrier signal from a synthesizer 224 and outputs it, a transmitter 223 which modulates a modulated signal from the modulator 232 with a carrier signal from the synthesizer 224 and transmits through the transmit/receive switch 221, the synthesizer 224 which synthesizes the carrier signal from an oscillating signal from a crystal oscillator 225 and outputs it, an RSSI generator 226 for detecting a received field level, and an RSSI judgment part 227.

The modem section 230 includes a demodulator 231 which detects to demodulate a modulated signal received from the receiver 222 and outputs as serial data and a modulator 232 which modulates serial data from a transmitting circuit (TX) 242 of the TDMA 240 and outputs.

The TDMA section 240 comprises a receiving circuit (RX) 241 including a TDMA decoder for effecting a decoding treatment for time division multiple accessing to take an own slot signal from demodulated serial data from the demodulator 231, the transmitting circuit (TX) 242 including a TDMA encoder for encoding the aural signal from an ADPCM coadic 251 to a transmission slot, a UW detector 243 for detecting a unique word from the demodulated serial data, and a synchronization generator 244 for controlling to synchronize with the cell station 100 or another personal station 200 according to the detected result by the UW. The talking section 250 includes an ADPCM coadic 251 which is a decoding device of the adaptive differential pulse code modulating method which uses the redundancy of an aural signal to effect audio encoding with a less delay by a simple treatment while keeping speech quality according to linear prediction of the aural signal, and is connected to the speaker 260 as a receiver and the microphone as a transmitter.

The controller 270 comprises a microprocessor and controls the whole device. The controller 270 is connected to the memory 271 for storing information for controlling, a program and abbreviated dial numbers, the sounder 272 for producing a ringing tone or the like, the operation element 273 for operating the device including a key dial operation, and the display 274 for showing a screen required for communication and dial numbers.

Figure 17:
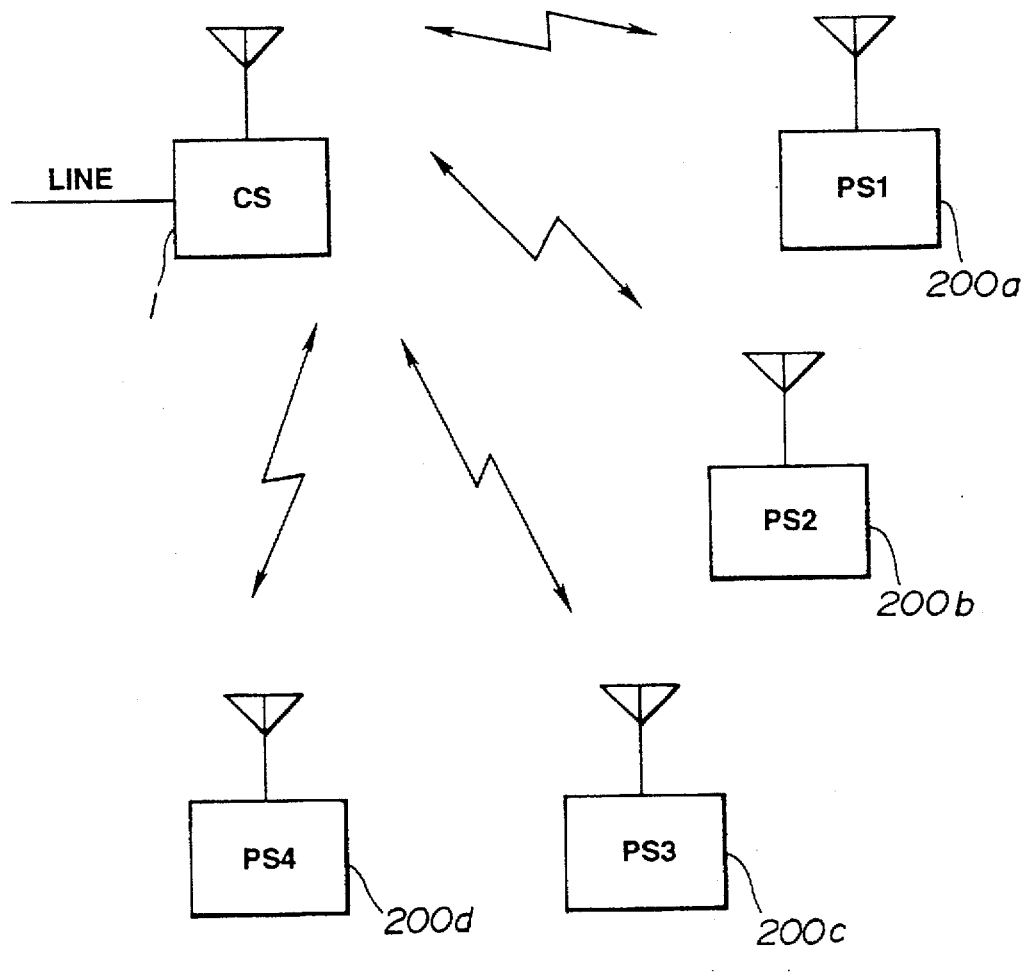
FIG. 17 is a schematic view showing a state of communications between a cell station and personal stations of the digital mobile transmission system.
Figure 18:
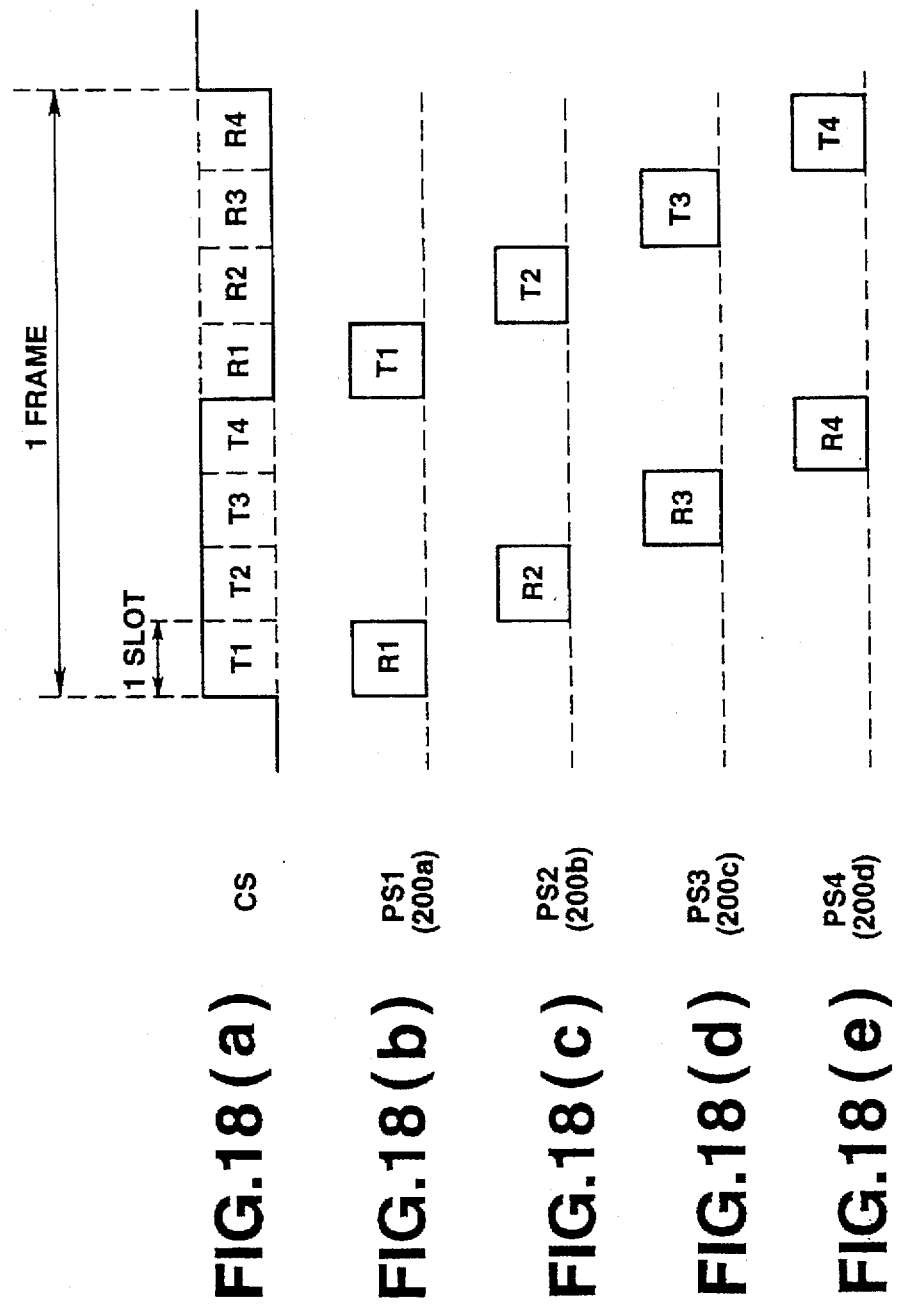
FIGS. 18(a) to 18(e) show structural views of a time slot in communication between a cell station and personal stations in the digital mobile communication system.
Figure 19:
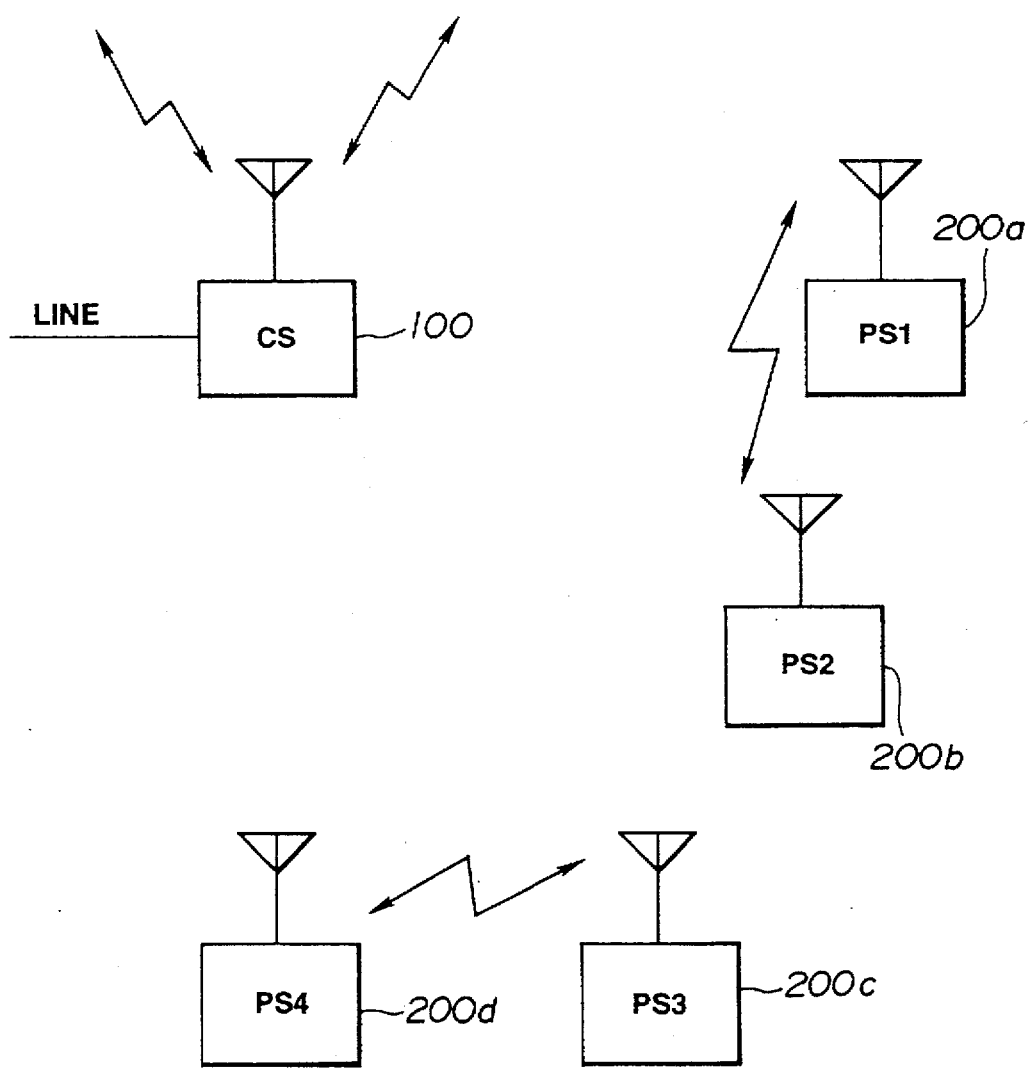
FIG. 19 is a schematic view showing a communicating state in the digital mobile communication system.

The cell station 100 and the mobile stations 200 are used as the system's cell station (CS) and personal stations (PS1 to PS4) as shown in FIG. 17 and FIG. 19. The communication modes of the digital mobile communication system according to the invention operated in the above configurations include a so-called master-slave mode to communicate between the cell station 100 and the mobile stations (hereinafter referred to as the personal station) and a transceiver mode to directly communicate between the personal stations 200 without through the cell station 100.

In the master-slave mode, the cell station 100 specifies TDMA timing and frequency such as communication frame and time slot, and the respective personal stations are subordinately operated according to the cell station 100. FIG. 3 is a table showing the relation between channel frequencies and carrier numbers used in the digital mobile communication system according to the invention. As a frequency to be allocated to the communication in the master-slave mode, the frequency of carrier number 12 or 18 in the table is used.

The communication in the master-slave mode will be described with reference to FIG. 4. In the master-slave mode, a call from the personal station 200 is made according to the control sequence shown in FIG. 4(a). When the off-hook operation of the calling personal station 200 is made, control is performed to establish a link channel (LCH). After the off-hook, this control is performed in a procedure that the calling personal station 200 transmits a link establishment request message, the cell station 100 having received the message transmits a link channel allocation message to the calling personal station 200, the calling personal station 200 transmits a synchronous burst, and the cell station 100 having received the burst transmits the synchronous burst to the calling personal station 200.

After establishing the link channel, a call setting is started by transferring a call setting message (CC) from the calling personal station 200 to the cell station 100. The cell station 100 receives the call setting message (CC) and checks that the acceptance of the call is appropriate, the cell station 100 transmits a call setting acceptance message (CC) to the calling personal station 200 to indicate that the call is being processed, and the state is changed to a "call acceptance" state. Then, the calling personal station 200 inform a secret key to the cell station 100 according to a secret key setting message (RT).

On the other hand, after receiving the secret key setting message (RT), the cell station 100 issues an authentication random number and transmits an authentication request message (MM) to the calling personal station 200 to notice the random message. The calling personal station 200 having received the authentication request message (MM) uses its own authentication key to code the random number and uses an authentication response message (MM) to notice an authentication calculated result to the cell station 100.

The cell station 100 having received the authentication response message (MM) determines whether an authentication calculated result obtained by similarly using an authentication random number and an authentication key in the home memory of the calling personal station 200 agrees with the authentication calculated result noticed by the calling personal station 200. If the authentication result is no good, a call release procedure is started according to a call disconnect restoring specification, and if OK, the call connection is continued.

The cell station 100 having received the authentication response message (MM) transmits a calling message (CC) to the calling personal station 200. At the time, a ring-back tone (RBT) is transmitted to the calling personal station 200. Besides, the cell station 100 transmits a response message (CC) to the calling personal station 200, and the calling personal station 200 makes a transition to a state of communicating with the cell station 100.

And, in the master-slave mode, a call to the personal station 200 is performed according to the control sequence shown in FIG. 4(b). For example, when called through a line wire, the cell station 100 detects the call and transmits a call received message (LCH) to a called personal station 200 to indicate the receipt of the call. Upon receiving the call received message (LCH), the called personal station 200 controls to establish a link channel. This control is performed in a procedure that a link channel establishment request message is transmitted from the called personal station 200, the cell station having received the link channel establishment request message transmits a link channel allocation message to the called personal station 200, a synchronous burst is transmitted from the called personal station 200, and the cell station 100 having received the synchronous burst transmits the synchronous burst to the called personal station 200.

After establishing the link channel, the called personal station 200 transmits a call response message (RT) to the cell station 100. The cell station 100 having received the call response message (RT) transmits a call setting message (CC). The called personal station 200 having received the call setting message (CC) responds by a call setting received message (CC).

Then, the called personal station 200 notices a secret key to the cell station 100 by a secret key setting message (RT). On the other hand, upon receiving the secret key message (RT), the cell station 100 produces an authentication random number and transmits an authentication request message (MM) to the called personal station 200 to notice the random number. The called personal station 200 having received the authentication request message (MM) encodes the random number with its own authentication key and notices an authentication calculated result to the cell station 200 by an authentication response message (MM). The cell station 100 having received the authentication response message (MM) determines whether an authentication calculated result obtained by similarly using an authentication random number and an authentication key in the home memory of the called personal station 200 agrees with the authentication calculated result noticed by the called personal station 200. If the authentication result is no good, a call release procedure is started according to a call disconnect restoring specification, and if OK, the call connection is continued.

The called personal station 200 having transmitted the authentication response message (M) transmits a calling message (CC) or response message (CC) at the discretion of a user. When the called personal station 200 is off-hooked after transmitting the calling message (CC), this personal station 200 transmits a response message (CC) to the cell station 100 to notice the receipt of the call.

The cell station 100 having received the response message (CC) transmits a response confirmation message (CC) to the called personal station 200. The called personal station 200 makes a transition to a "busy" state upon receiving the response confirmation message which indicates the completion of line connection.

Compared with the communication in the master-slave mode, in the transceiver mode, a personal station 200 having its calling key operated earlier becomes a calling personal station 200, and produces TDMA timing such as a frame and a time slot. And, for the frequency, a channel different from the one used in the master-slave mode is used. A personal station 200 having received a calling signal from the calling personal station 200 becomes a called personal station and operates in subordinate synchronization not with the TDMA timing from the cell station but with the TDMA timing of the calling personal station. Thus, the personal station-to-personal station communication is performed asynchronous with the TDMA timing of the cell station 100.

Briefly, the direct communication between the personal stations is performed as follows. To directly communicate between the personal stations in a state that a plurality of personal stations 200 are disposed as personal stations (PS1 to PS4) as shown in FIG. 19 for example, it is necessary to previously set the operation mode of personal stations 200a to 200d which are to be used to communicate directly between them to the transceiver mode.

The transceiver mode can be set by operating for example a prescribed key (e.g., the transceiver mode switch is depressed.) of the operation element 273 of the personal stations 200a to 200d. When the transceiver mode is set, the personal stations 200a to 200d are held in a wait state to receive only a signal allocated to the personal station-to-personal station direct communication. In this embodiment, the signal allocated to the personal station-to-personal station direct communication is assumed to include ten waves of the carrier numbers 1 to 10 shown in the table of FIG. 3.

Figure 5:
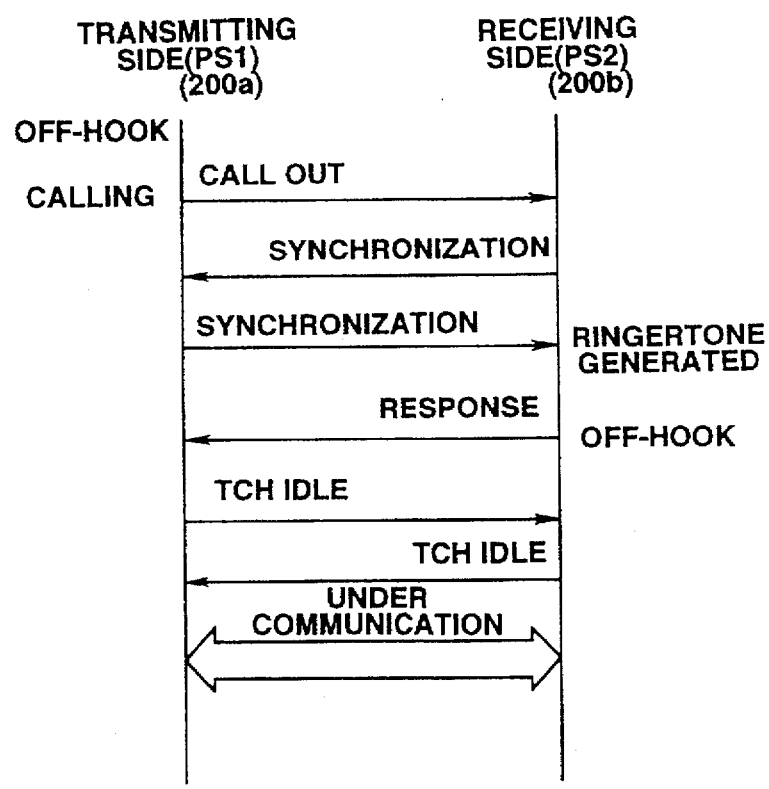
FIG. 5 is a communication control sequence in a transceiver mode in the system according to the invention.

After setting of the above wait state, the personal station-to-personal station direct communication is started according to the control sequence as shown in FIG. 5. Specifically, in the above wait state, a calling personal station, for example, 200a (PS1) detects a free channel and transmits as a calling signal a burst at intervals of once per 5 ms for 10 seconds to a called personal station, for example, 200b (PS2).

At the time, the called personal station 200b changes the frequencies allocated to the personal station-to-personal station direct communication for 10 times to receive asynchronously in order, thereby performing an intermittent receiving of the above 10 waves. When called by the calling personal station 200a, the called personal station 200b receive this call, and to synchronize with the calling personal station 200a, the called personal station 200b communicates with the calling personal station 200a to mutually transmit and receive a signal with no data in a format of the control signal.

Through this operation, the called personal station 200b having received a synchronous signal from the calling personal station 200a produces a ringertone to call an operator. Then, when the operator operates to off-hook, the called personal station 200b identifies this operation as a response operation and transmits a response signal to the calling personal station 200a.

On the other hand, the calling personal station 200a having received the response signal from the called personal station 200b transmits as a preprocessing to use a speaking channel a "Tch idle" signal without data in a signal format for speaking, and the called personal station 200b having received this signal transmits the same "Tch idle" signal to the calling personal station 200a. Through the transmit/receive of the "Tch idle" signal, the calling personal station 200a and the called personal station 200b can communicate directly. In the above personal station-to-personal station direct communication, a control channel (Cch) and a speaking channel (Tch) use the same frequency and slot. Specifically, in the personal station-to-personal station direct communication, a call from the calling personal station 200a to the called personal station 200b and the subsequent transmit/receive of a synchronous signal between the calling personal station 200a and the called personal station 200b are performed by using the Cch, then, after simply changing from the Cch to the Tch without changing the frequency and communication slot, the Tch is used to transmit the "Tch idle" signal.

In a conventional system of this type, to start the above personal station-to-personal station direct communication, a receiving level of a target communication slot is detected, and the communication slot is determined based on the received result, so that setting of an appropriate communication slot is often disturbed due to fading or the like.

On the other hand, the invention is characterized in that a personal station, which is to start the personal station-to-personal station direct communication, monitors the pattern and signal level of a signal being transmitted by a busy personal station or cell station, and based on the monitored result, synchronizes with the busy personal station or cell station to determine a communication slot.

In this case, when a certain personal station attempts to start the personal station-to-personal station direct communication, the already established communication may be between the cell station 100 and the personal stations 200 in the master-slave mode and between the personal stations 200 in the transceiver mode.

Figure 6A:
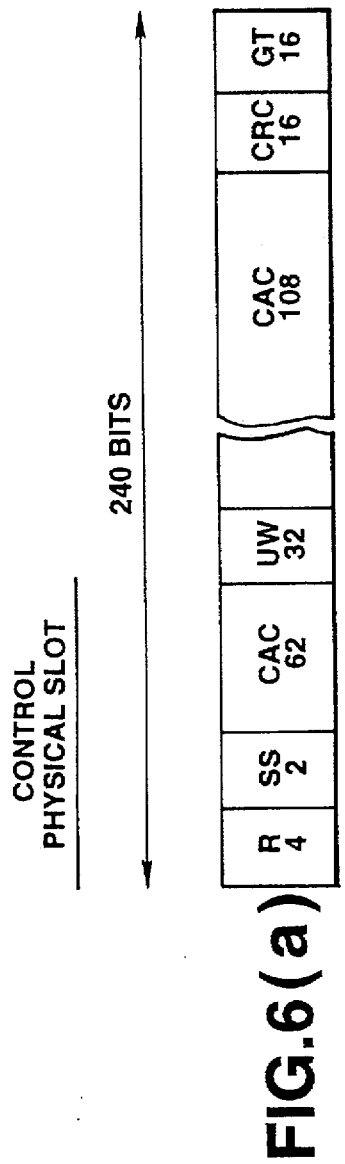
FIGS. 6(a) and 6(b) are diagrams showing an example of the formats of a physical control slot and a physical communication slot used in the system according to the invention.
Figure 6B:
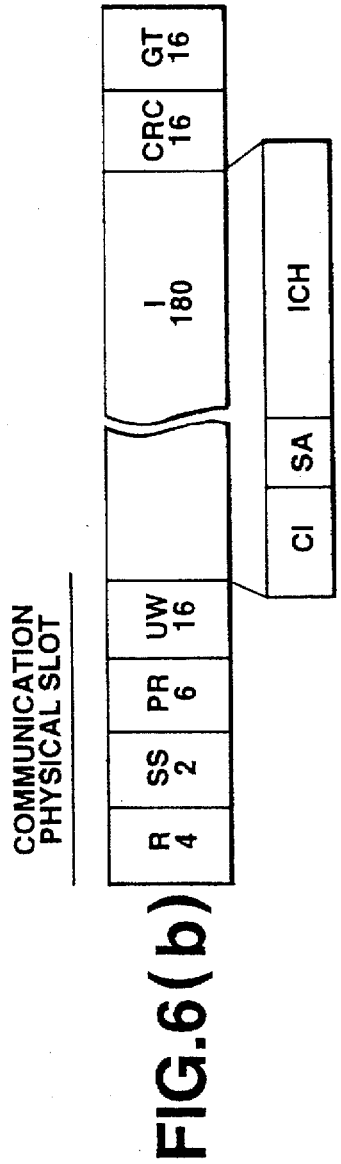

FIGS. 6(a) and 6(b) show an example of the configurations of a signal transmitted between the cell station 100 and the personal stations 200 or between the personal stations 200 in either of the above communication modes. Specifically, FIG. 6(a) shows a signal format of the control slot and FIG. 6(b) a signal format of the speaking slot.

In FIG. 6(a), the control slot comprises a transient response ramp time (R), a start symbol (SS), common access channels (CAC), a unique word (UW), a cyclic redundancy check (CRC), and a guard time (GT). And, in FIG. 6(b), the speaking slot comprises a transient response ramp time (R), a start symbol (SS), a preamble (PR), a unique word (UW), an information (I), a cyclic redundancy check (CRC), and a guard time (GT). The information (I) in the speaking slot comprises a channel identifier (CI), a slow associated control channel (SA), and voice data (ICH). With the speaking slot having the above structure, the above SA can be used to transmit and receive the control data. And, another method of transmitting and receiving the control data by using this speaking slot stills the above ICH or stops a voice to transmit the control data. In FIG. 6(a) and FIG. 6(b), the number below each signal name designates the number of bits of the signal.

It is seen from FIG. 6(a) and FIG. 6(b) that both the control slot and the speaking slot have the unique word (UW) as one of the common signals. In this invention, to start the personal station-to-personal station direct communication, it is assumed that a personal station 200 monitors the unique word as a signal to synchronize with another busy personal station 200 or cell station 100.

Specifically, to start the personal station-to-personal station direct communication with a personal station, e.g., 200b, a personal station 200a for example receives through the antenna 210, the transmit/receive switch 221 and the receiver 222 a signal transmitted from the control slot (see FIG. 6(a)) or the communication slot (see FIG. 6(b)) by personal stations 200c and 200d which are in the personal station-to-personal station direct communication or the cell station 100 which is already in communication with either or both of the personal stations 200c and 200d, demodulates the signal by the demodulator 231 and transfers it to the TDMA 240 through the modem 230, then receives the demodulated signal by the receiving circuit (RX) 241.

In the above process, the TDMA 240 detects the signal pattern and signal level of UW contained in the demodulated signal by the UW detector 243 and enters the detected result into the controller 270. The controller 270 determines a timing of the receiving slot in view of the position of the detected UW, starts the synchronization generator 244 after recognizing the head of the receiving frame, and makes the timing of its own slot and frame conform with that of the above receiving slot and receiving frame, thereby controlling to synchronize with another busy personal station 200 or the cell station 100.

When synchronization is established, the controller 270 of the personal station 200a determines a communication slot which does not interfere with the other busy personal stations 200c and 200d or the cell station 100 with which the personal station 200a is synchronized while monitoring the multiple accessing at the transmitting circuit (TX) of the TDMA 240 or the decomposition process at the receiving circuit (RX), and uses the determined communication slot to start the personal station-to-personal station direct communication with the personal station 200b.

On the other hand, when the personal station 200a is not synchronized with the other busy personal stations 200c and 200d or the cell station 100, the controller 270 of the personal station 200a determines a communication slot with its own timing, and starts the personal station-to-personal station direct communication.

Thus, in the present invention, a personal station 200 which attempts to start the personal station-to-personal station direct communication has two operation modes, a master mode and a slave mode, falls in the master mode when there is no other personal station 200 or cell station 100 which is already busy at the same frequency, determines a communication slot with its own timing to enter the personal station-to-personal station direct communication, but falls in the slave mode when there is another personal station 200 or cell station 100 which is already busy, detects the signal pattern and signal level of UW (unique word) transmitted by a personal station 200 in the master mode or its communication personal station 200 or cell station 100 to synchronize, determines a communication slot to be used, and starts the personal station-to-personal station direct communication.

If the system is provided with only the slave mode, a unique word can not be detected in a state that a communication has not been made when the personal station-to-personal station direct communication is started and a communication slot can not be determined, but if the master mode is also provided as described above, the personal station-to-personal station direct communication can be independently started from a state where there is no other personal station 200 or cell station 100 which is already busy.

Figure 7:
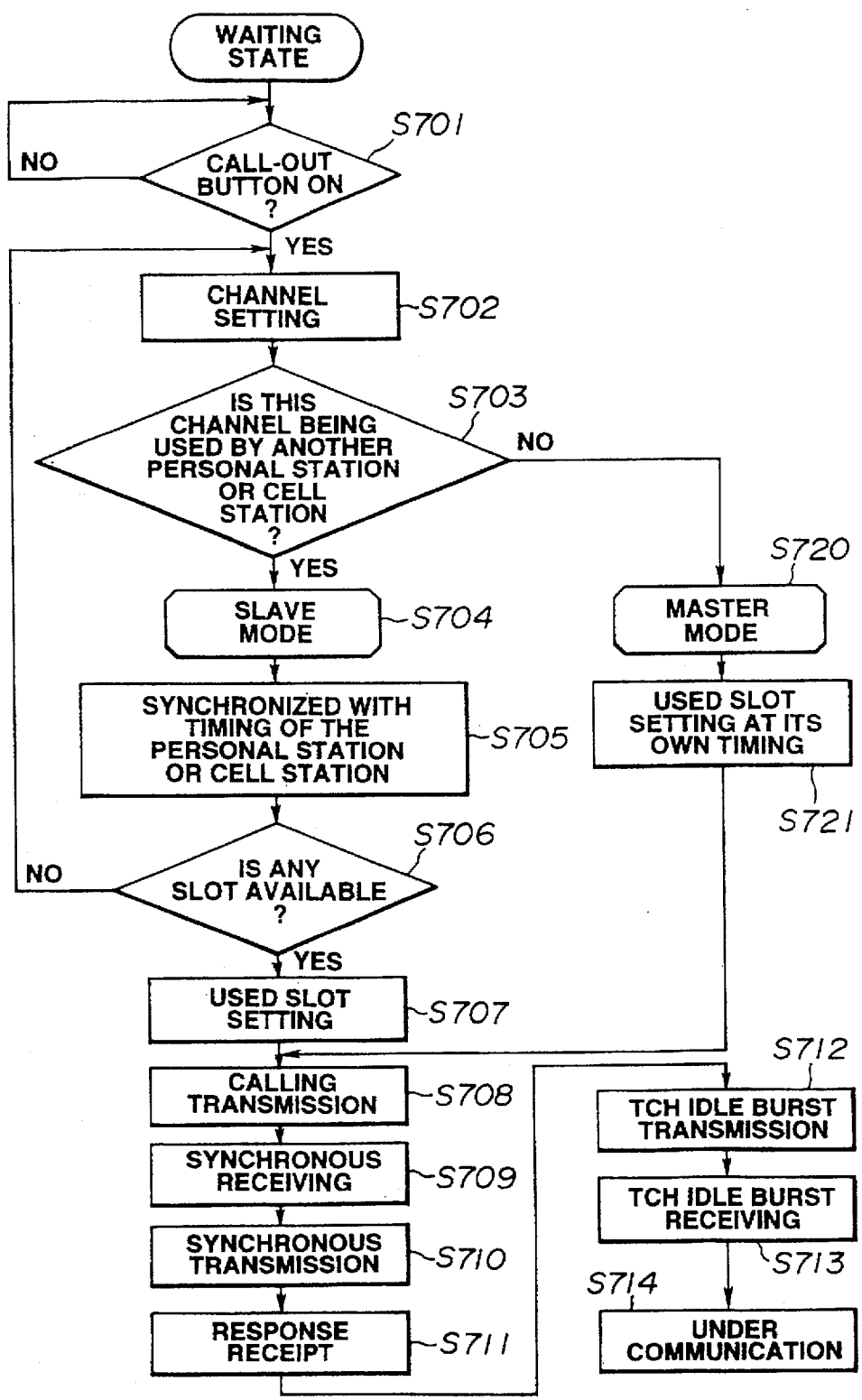
FIG. 7 is a flowchart showing the control operation of a calling personal station in the transceiver mode in the system according to the invention.
Figure 8:
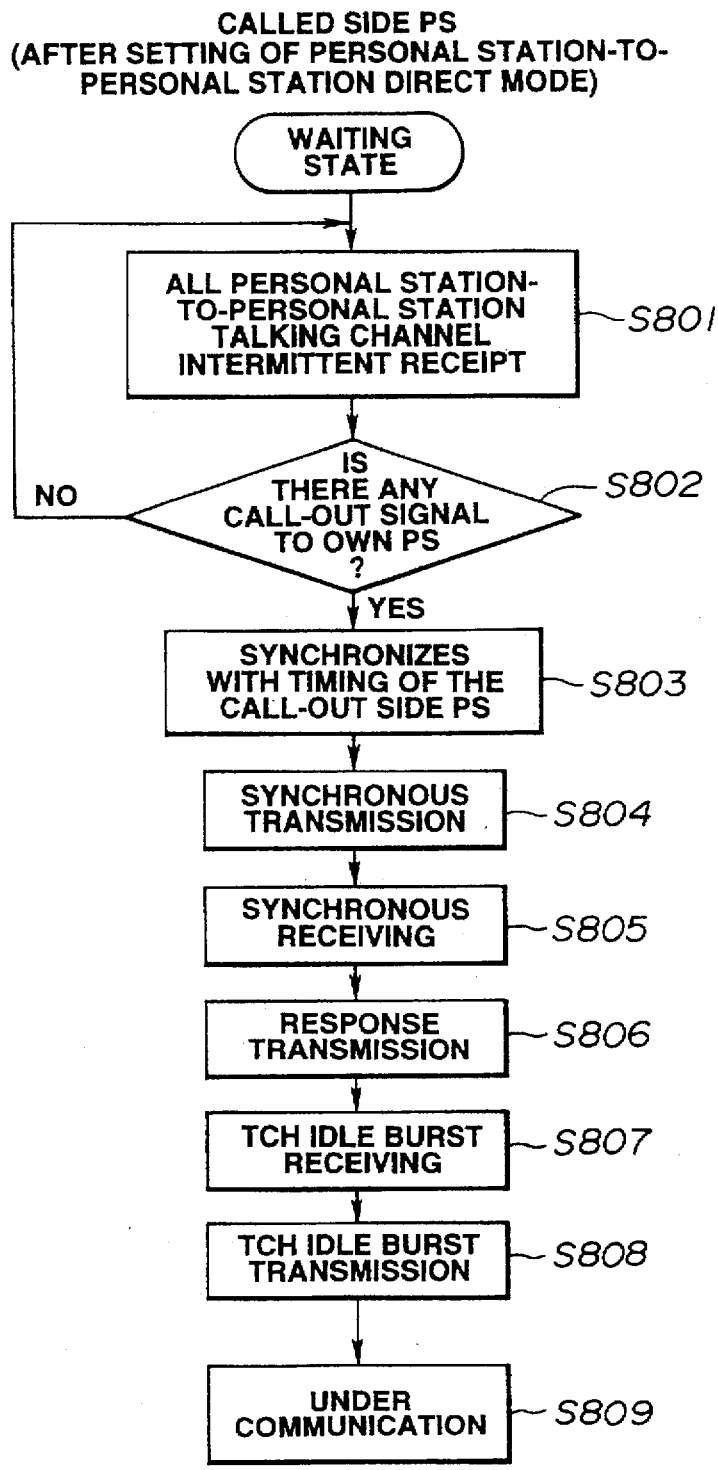
FIG. 8 is a flowchart showing the control operation of a called personal station in the transceiver mode in the system according to the invention.

Details of the personal station-to-personal station direct communication of the digital mobile communication system according to the invention will be described in connection with the operations of a calling personal station and a called personal station with reference to the flowcharts shown in FIG. 7 and FIG. 8. FIG. 7 shows the operation of a calling personal station, and FIG. 8 shows the operation of a called personal station.

In a waiting state after completing the setting of the transceiver mode, a calling personal station 200a which is going to start the personal station-to-personal station direct communication with a personal station 200b monitors where the calling button of the operation element 273 has been turned "ON" or not (step 701).

When the calling button has been turned "ON" (step 701 YES), one channel is selected from given free channels, and it is set as a use channel (step 702). Then, it is monitored whether there is a personal station 200c, 200d or cell station 100 which is using this set channel (step 703). To monitor, a signal received through the antenna 210, the transmit/receive switch 221 and the receiver 222 is checked for the received field strength through the RSSI generator 225 and the RSSI judgment part 227, and the checked result is evaluated by the controller 270.

When it is found that the above set channel is being used by the personal station 200c, 200d or cell station 100 (step 703 YES), the calling personal station 200a enters the slave mode (step 704), but when it is not (step 703 No), the calling personal station 200a enters the master mode (step 720).

In the slave mode, the calling personal station 200a is controlled to synchronize with the operation timing of the personal station 200c, 200d or cell station 100 which is using the set channel (step 705). This synchronization control is performed for example by detecting the pattern and signal level of a specified signal being transmitted from the control slot or the speaking slot of the busy personal station 200c, 200d or cell station 100, finding a timing of the above communication in view of the detected result, and synchronizing its own timing with the found timing.

And, after synchronizing with the busy personal station 200c, 200d or cell station 100, the calling personal station 200a judges whether a communication slot is available (step 706), and returns to the step 702 when a communication slot is not available (step 706 NO) to continuously operate to set another channel.

On the other hand, when a communication slot is available (step 706 YES), the calling personal station 200a sets its own communication slot as the use slot (step 707), and performs the communication procedure with a called personal station 200b (see the control sequence shown in FIG. 5).

In this communication procedure, the calling personal station 200a transmits "calling" (step 708), receives "synchronism" being transmitted from the called personal station 200b in response to the "calling" (step 709), and transmits "synchronism" to the called personal station 200b (step 710).

Then, upon receiving "response" from the called personal station 200b in response to "synchronism" transmitted in the step 710 (step 711), the calling personal station 200a transmits "Tch idle burst" (step 712), receives "Tch idle burst" from the called personal station 200b (step 713), and enters a state of communicating with the called personal station 200b (step 714).

In step 703, when there is not a personal station 200c, 200d or cell station 100 which is using the previously set channel and the calling personal station 200a enters the master mode (step 720), the calling personal station 200a sets a communication slot to be used with its own timing (step 721). After setting the communication slot, the same operation as in the slave mode is performed (step 708 to step 713). Thus, after completing the preprocessing (transmission and receiving of the Tch idle burst) to use the communication channel, the calling personal station 200a enters the personal station-to-personal station direct communication with the called personal station 200b (step 714).

In contrast to the operation of the calling personal station 200a, the called personal station 200b controls according to the flowchart shown in FIG. 8. First, the called personal station 200b in the waiting state after setting the transceiver mode intermittently receives all channels for communicating between the personal stations (step 801). Then, the called personal station 200b judges whether the receiving channels have a calling signal directed to the called personal station 200b (step 802). When no calling signal is directed to the called personal station 200b (step 802 NO), the called personal station 200b continues the above intermittent receiving and the judgment of a calling signal directed to the called personal station 200b.

On the other hand, when it is found that an intermittently received channel has a calling signal directed to the called personal station 200b (step 802 YES), the called personal station 200b controls (reception of a call) to synchronize with the timing of the calling personal station 200a (step 803).

Then, the called personal station 200b is prepared to enter the personal station-to-personal station direct communication with the calling personal station 200a through the sequence control after the reception of "calling" shown in FIG. 5. Specifically, the called personal station 200b having been synchronized with the calling personal station 200a in the step 803 transmits "synchronism" to the calling personal station 200a (step 804). After receiving the "synchronism" transmitted from the calling personal station 200a in response to the "synchronism" from the called personal station 200b (step 805), the called personal station 200b calls an operator by means of a ringertone or the like, checks the operation to respond to this call, and transmits "response" to the calling personal station 200a (step 806). Then, the called personal station 200b receives "Tch idle burst" from the calling personal station 200a (step 807), transmits "Tch idle burst" to the calling personal station 200a (step 808), and enters the personal station-to-personal station direct communication with the calling personal station 200a (step 809).

Thus, each personal station 200 according to the invention is provided with functions to attempt to start a personal station-to-personal station direction communication monitors the signal pattern and signal level of a signal being transmitted by another personal station 200 or the cell station 100 which is already busy then, to synchronize with such a busy personal station 200 or cell station 100, and to determine a communication slot.

Figure 9:
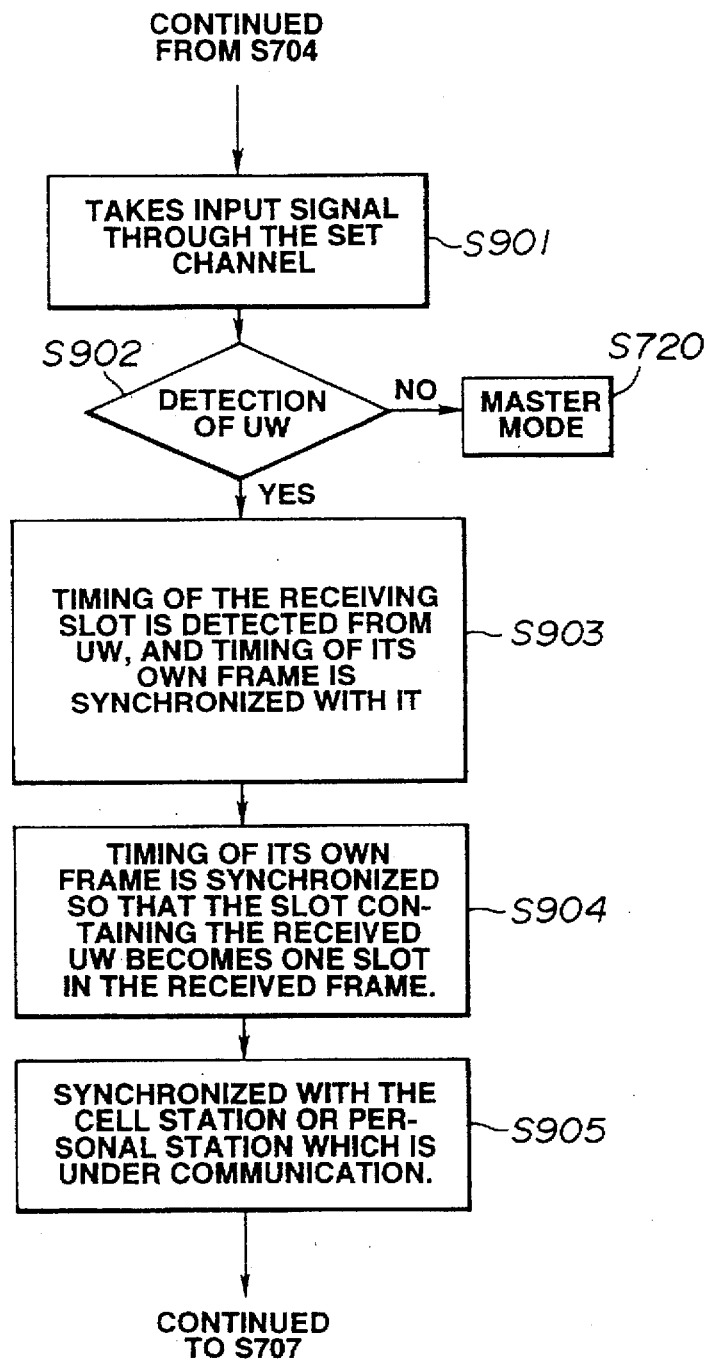
FIG. 9 is a flowchart showing the synchronizing operation in the transceiver mode in the system according to the invention.

An example of control to synchronize in the step 705 will be described with reference to the flowchart shown in FIG. 9. A signal to be monitored in order to synchronize in this example is UW (unique word) which is contained in the control slot or speaking slot of the busy personal station 200 or cell station 100.

Specifically, in the process shown in FIG. 7, when the calling personal station 200a judges that the above set channel is being used by the personal station 200c, 200d or cell station 100 (step 703 YES) and enters the slave mode (step 704), the busy personal station 200c, 200d or cell station 100 receives a signal being transmitted from the control slot (see FIG. 7(a)) or the communication slot (see FIG. 6(b)) via the antenna 210, the transmit/receive switch 221 and the receiver 222, demodulates the signal by the demodulator 231 through the modem 230, and transfers it to the TDMAh1 240 (step 901).

The TDMA 240 transmits the received signal to the UW detector 243 through the receiving circuit (RX) 241 to detect the UW (unique word) contained in the received signal (step 902). When the UW is not detected by the UW detector 243 (step 902 NO), the calling personal station 200a returns to the master mode (step 720).

On the other hand, when the UW is detected by the UW detector 243 (step 902 YES), the detected result is sent to the controller 270. From the outset, the controller 270 is managing the synchronization generating control in the synchronization generator 244, and after recognizing the structure of the whole frame and each communication slot shown in FIG. 6, manages the timing of the whole frame and each slot according to an elapsed time by clocking means. Therefore, when UW is detected in the step 902, the head position of the frame and the timing of the receiving slot can be recognized according to a time relation from the position of the UW. At the time, it is necessary to discriminate between the control slot and the speaking slot, and the signal pattern is detected because these slots have a different number of bits or a signal pattern (see FIG. 6), to allow an easy discrimination between the control slot and the speaking slot.

After the detection of the UW in the step 902, the controller 270 uses the above functions to determine the timing of the receiving slot in view of the position of the UW, and operates the synchronization generator 244 so as to synchronize the timing of its own slot, thereby synchronizing the slots (step 903).

Furthermore, after completing the synchronization of the slots, the controller 270 operates the synchronization generator 244 to synchronize with its own frame so that the slot containing the received UW becomes one of the slots in the receiving frame, thereby synchronizing the frames (step 904).

Through the slot synchronization and the frame synchronization, the calling personal station 200a is synchronized with the busy personal station 200c, 200d or cell station 100 (step 905), and the calling personal station 200a judges whether there is a slot available for the synchronized slot (step 706) and sets the available communication slot as the use slot (step 707).

Figure 10:
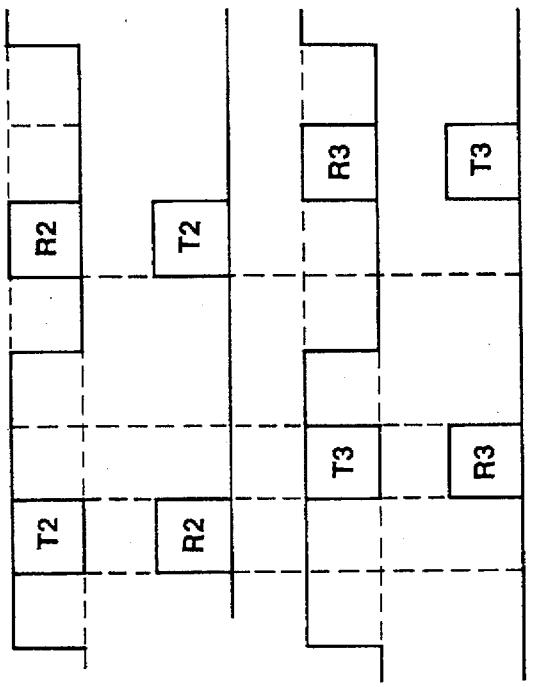
FIGS. 10(a) to 10(d) show a diagram illustrating an example of setting a time slot in the transceiver mode in the system according to the invention.

An example of setting the communication slot by applying the above synchronization establishing control will be described with reference to FIG. 10. When the cell station 100 and the personal stations 200 are operated in the arrangement for example as shown in FIG. 19, FIG. 10 is a time chart showing one example of the communication slot which is set to start another personal station-to-personal station direct communication between the personal station 200c and the personal station 200d from a state that the personal station 200a and the personal station 200b are already in the personal station-to-personal station direct communication.

Under the above operating conditions, before the personal station 200c and the personal station 200d start the personal station-to-personal station direct communication, the personal station 200a and the personal station 200b are already communicating mutually by using the control slot and the communication slot as shown in FIG. 6. Therefore, the personal station 200a uses the transmission slot T2 to transmit and the receiving slot R2 to receive, and the personal station 200b receives with the timing of the transmitting slot T2 of the personal station 200a and transmits with the timing of the receiving slot R2 of the personal station 200a according to the timings shown in FIG. 10(a) and (b).

Under the above conditions, when the personal station 200c requests to start the personal station-to-personal station direct communication with the personal station 200d, the calling personal station 200c monitors the pattern and the receiving level of a signal (UW in the control slot and the communication slot) being transmitted from the busy personal stations 200a and 200b, synchronizes the busy personal stations 200a and 200b based on the monitored result, and determines the communication slot of the timings as shown in FIG. 10(c) and (d).

Specifically, the personal station 200c uses the transmitting slot T3 to transmit and the receiving slot R3 to receive, and the personal station 200d receives with the timing of the transmitting slot T3 of the personal station 200c and transmits with the timing of the receiving slot R3 of the personal station 200c. Since the communication slot between the personal station 200c and the personal station 200d is set upon completely synchronizing the busy personal stations 200a and 200b, a conventional problem such as time Δt shown in FIG. 20 can be eliminated, and the multiple accessing at the same frequency can be performed without producing time when a communication cannot be made.

As described above, in the digital mobile communication system of the TDMA-TDD method according to the invention, a personal station which is going to call in the slave mode detects the pattern and the signal level of a signal being transmitted by a busy personal station or cell station, synchronizes with the busy personal station or cell station to determine a communication slot, eliminates a delay time until the communication slot is determined, can make the multiple accessing at the same frequency without producing time when a communication cannot be made, and can improve the efficiency of the frequency.

Now, descriptions will be made of the extension transfer function and the broadcast address paging function of the digital mobile communication system according to the invention. A conventional system of this type performs the extension transfer or broadcast address paging through the cell station 100, and needs one slot each for the uplink line from the calling personal station 200 to the cell station 100 and the downlink line from the cell station 100 to the called personal station 200, needing to occupy a total of two speaking slots of the cell station 100. Thus, the efficiency of using the slots cannot be prevented from being deteriorated.

On the other hand, the present invention uses the slave mode to perform the extension transfer and the broadcast address paging without through the cell station 100, eliminates the need to return the uplink line and the downlink line, and uses only one communication slot.

The control operation for the extension transfer in the digital mobile communication system according to the invention will be described with reference to the control sequence shown in FIG. 11.

It is assumed that the cell station and the personal stations of the invention are operated in the arrangement for example as shown in FIG. 17 and the personal station 200a is in communication with a certain line wire through the cell station 100. To perform the extension transfer from the personal station 200a to the personal station 200b, the transferring personal station 200a transmits a "hold request" message to the personal station 200b. At the time, the transferring personal station 200a attach to the "hold request" message a "hold call number" for discriminating a call to be held.

Specifically, the "hold request" message is transmitted by depressing for example the transfer switch on the operation element 273 of the transferring personal station 200a and entering the hold call number from the operation element 273.

Based on the received "hold request" message, the cell station 100 controls the above busy line wire in the held condition, and transmits a "disconnect" message to the personal station 200a to disconnect the communication with the personal station 200a.

Then, a "calling (transfer request)" message is transmitted from the transferring personal station 200a to the transferred personal station 200b. To transmit the "calling" message, for example the mode setting switch on the operation element 273 of the transferring personal station 200a is depressed to set the transceiver mode, and the calling key on the operation element 273 is operated. Accordingly, the "calling (transfer request)" message is transmitted from the transferring personal station 200a to the transferred personal station 200b via the control slot.

The transferred personal station 200b having received the "calling" message rings a receive tone by the sounder 272. An operator having been noticed a call incoming by this receive tone depresses a specific key on the operation element 273 to respond, and a "response" message is transmitted to the transferring personal station 200a.

Thus, when the "response" message is returned from the transferred personal station 200b in response to the "calling"

message from the transferring personal station 200a, the transceiver mode is initiated. Now, a message "A telephone call from So-and-so (line wire=the above held call number)" can be transmitted from the transferring personal station 200a to the transferred personal station 200b. But, this message can be omitted by employing control of clearly indicating the extension transfer request and the held call number. For example, this control includes a method that the transferring personal station 200a transmits the "calling" message with the held call number added; and the transferred personal station 200b having received the "calling" message rings a special receive tone for the extension transfer by the sounder 272, stores the held call number in the memory 271, and shows it on the display 274.

When the above message has been noticed, the transferring personal station 200a uses the speaking slot to transmit a "disconnect" message to the transferred personal station 200b to disconnect the communication with the transferred personal station 200b.

On the other hand, the transferred personal station 200b which has been informed by the above message that it has to receive the extension transfer calls the cell station 100 after completing the communication with the transferring personal station 200a. At the time, the transferred personal station 200b uses the control slot to transmit a "call" message to the cell station 100 and adds the "held call number", which has been noticed from the transferring personal station 200a, to the "call" message. To transmit the "call" message, for example a call switch on the operation element 273 of the personal station 200b is depressed, and the "held call number" is entered with the operation element 273. When the transferred personal station 200b stores the held call number transmitted from the transferring personal station 200a, the transferred personal station 200b can read out the held call number and use it to call the cell station 100.

Meanwhile, the cell station 100 having received the "call" message from the transferred personal station 200b extracts the held call number from the "call" message, and compares with the held call number which has been noticed by the personal station 200a at the time of the hold request. When these held call numbers agree to each other, the personal station 200b is connected to the previously held line wire to enable mutual communications. When this speaking is completed, the personal station 200b uses the speaking slot to transmit a "disconnect" message to the cell station 100 to disconnect the line. Thus, the series of extension transfer operation is completed. After that, the transferred personal station 200b can communicate with the line wire.

Figure 12:
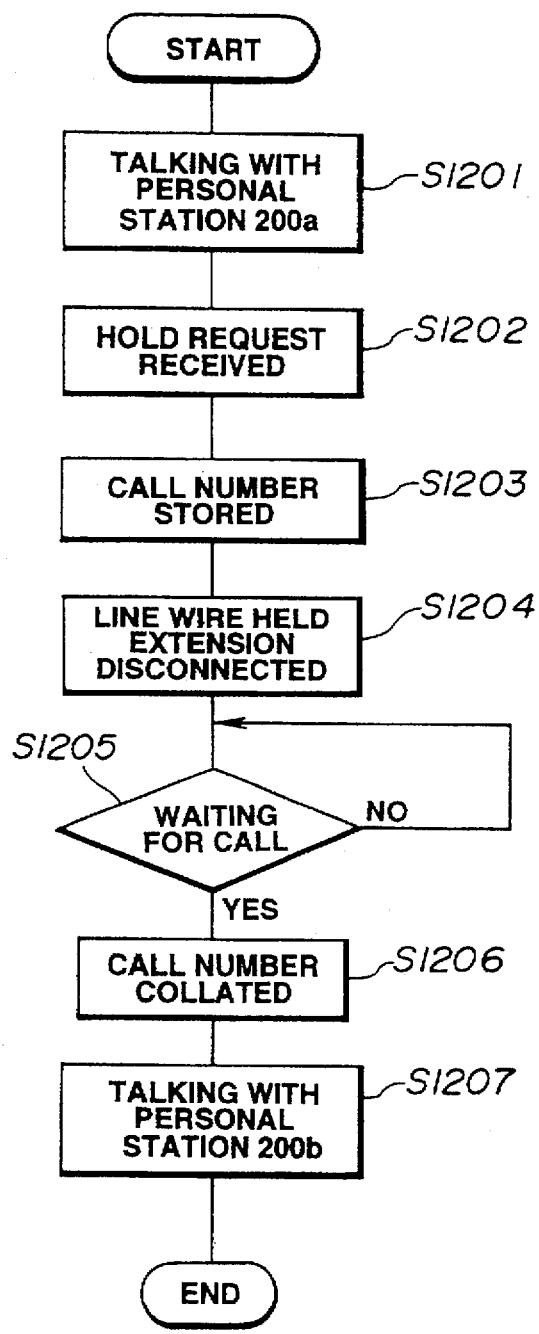
FIG. 12 is a flowchart showing the operation of a cell station in the extension transfer operation control by the system according to the invention.

Each operation of the cell station 100 and the transferred personal station 200b both associated with the extension transfer control will be described in further details. The operation of the cell station 100 at the extension transfer will be described with reference to the flowchart shown in FIG. 12. The cell station 100 in communication with the transferring personal station 200a (step 1201) receives the hold request (step 1202), stores the held call number contained in the signal into for example the memory 170 (step 1203), holds the line wire with which the cell station 100 is connected, and disconnects the extension from the transferring personal station 200a (step 1204).

Subsequently, the cell station 100 is in a state of waiting for a call from the transferred personal station 200b (step 1205). And, the extension transfer request and the held call number are noticed from the transferring personal station 200a to the transferred personal station 200b by the above communication procedure.

When the cell station 100 in the above state of waiting receives a call from the transferred personal station 200b, the cell station 100 demodulates the call signal by the demodulator 132, and takes it into the controller 160 through the TDMA decoder 122. The controller 160 extracts the held call number from the call signal and compares it with the held call number stored in the memory 170 (step 1206). If the compared held call numbers agree mutually, the line wire being held is connected to the transferred personal station 200b to enable mutual speaking (step 1207).

Figure 13:
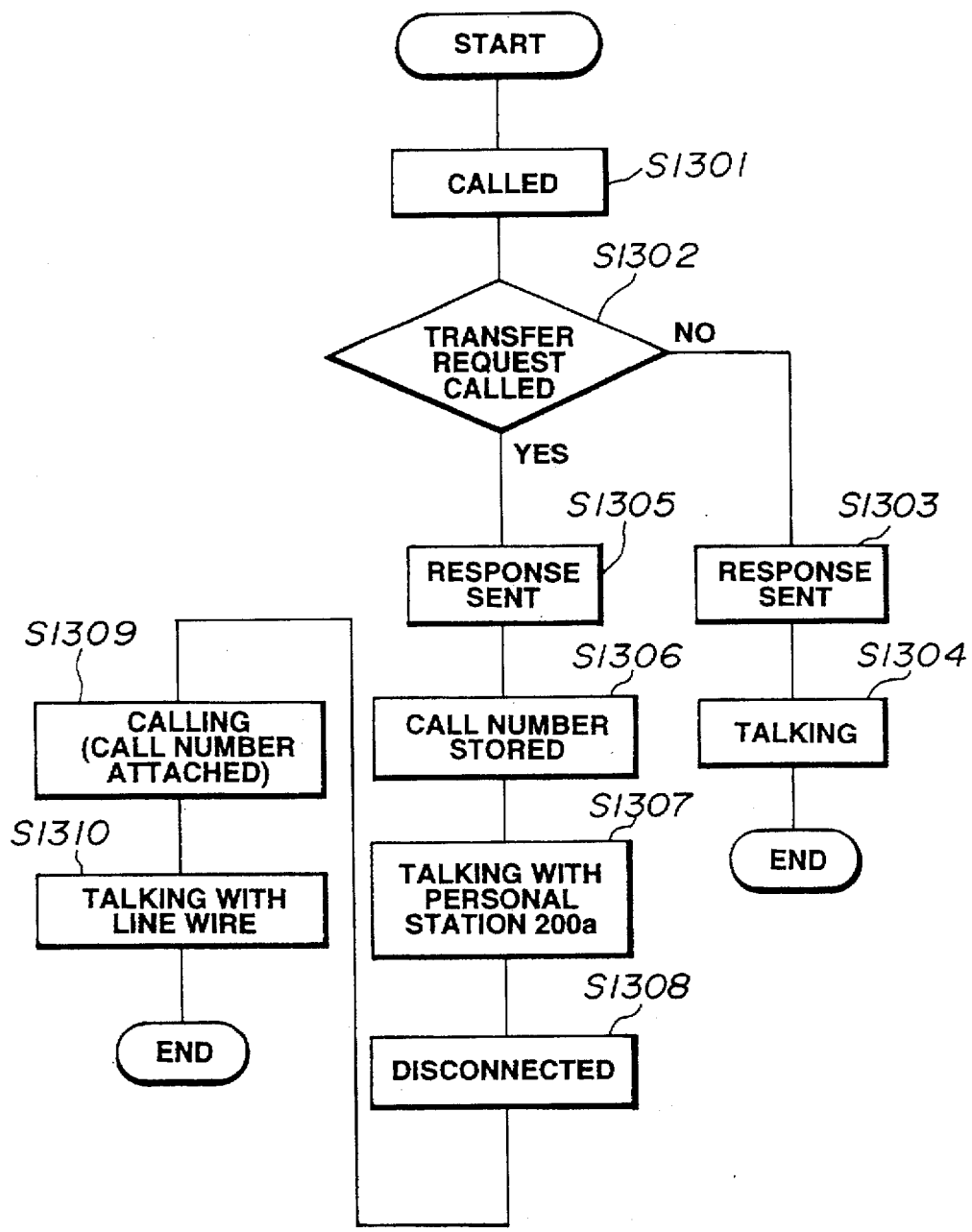
FIG. 13 is a flowchart showing the operation of a transferred personal station in the extension transfer operation control by the system according to the invention.

In contrast to the operation of the cell station 100, the transferred personal station 200b operates according to the flowchart as shown in FIG. 13. Specifically, the transferred personal station 200b receives the call (step 1301), and determines whether this call is a transfer request from the transferring personal station 200a (step 1302). When the call is judged not to be a call from the personal station 200a (step 1302 NO), a response is transmitted in response to the call (step 1303), and a general personal station-to-personal station communication is initiated (step 1304).

On the other hand, when the call is judged as a transfer requesting call from the transferring personal station 200a (step 1302 YES), the transferred personal station 200b transmits a response to the call (step 1305), and stores the held call number transmitted from the transferring personal station 200a in response to the response into the memory 271 for example (step 1306). Then, the transferred personal station 200b communicates with the transferring personal station 200a to notice "transfer requirements" (step 1307), and disconnects the wireless line with the transferring personal station 200a (step 1308). The "transfer requirements" includes the extension transfer request and the held call number such as "A telephone call from So-and-so (line wire=held call number)".

Subsequently, the transferred personal station 200b calls the cell station 100 according to the "transfer requirements" noticed as described above (step 1309). At the time, the held call number which has been received from the transferring personal station 200a and stored is added. Specifically, when the calling operation is made with the operation element 273, the controller 270 reads the held call number from the memory 271, and adds it to the call signal to transmit from the radio 220. Then, the transferred personal station 200b waits that the call is received by the cell station 100 where the operation is effected to connect the transferred personal station 200b and the held line wire, and the personal station 200b starts to speak with the line wire (step 1301).

In this operation of the transferred personal station 200b, the method described includes that the transferred personal station 200b stores the held call number transmitted from the transferring personal station 200a and automatically reads the held call number to transmit it to the cell station 100. But, in another method, the transferring personal station 200a may simply call the transferred personal station 200b to notice the held call number, and the transferred personal station 200b may enter the held call number to call the cell station 100. Besides, in the above operation, it has been described that the number of the line wire to be transferred to the personal station 200b is used as the "held call number", but when the transfer to be made by the extension transferring personal station can be clearly judged by the extension transferred personal station, other information (personal station number of the extension transferring personal station) may be used.

Now, the control operation to make the broadcast address paging in the digital mobile communication sequence according to the invention will be described with reference to the control sequence shown in FIG. 14. In this case, when the cell station 100 and the personal stations 200 are operated in the arrangement as shown in FIG. 17, the personal station 200a is assumed to make the broadcast address paging to the personal stations 200b, 200c and 200d.

When the mode setting switch on the operation element 273 of the calling personal station 200a is depressed to set the transceiver mode, and a prescribed key on the operation element 273 is depressed to make the calling operation for the broadcast address paging. Thus, the calling personal station 200a transmits a "simultaneous paging" message by using the control slot to the called personal stations 200b, 200c and 200d.

Meanwhile, the called personal stations 200b, 200c and 200d receive the "simultaneous paging" being transmitted from the calling personal station 200a, rings a receive tone by the sounder 272, and waits for the Tch idle burst.

The calling personal station 200a having transmitted the "simultaneous paging" message starts the timer disposed for example in the controller 270, uses the speaking slot to transmit the "Tch idle burst" when a time previously set by the timer is clocked, opens an audio speech path in the ADPCM coadic 251, and notices a multiaddress message by "voice" through the speaker 260. The Tch idle burst means a data-free signal to be transmitted in a signal format for speaking.

Meanwhile, the called personal stations 200b, 200c and 200d receive the "Tch idle burst" being transmitted from the calling personal station 200a, is controlled in a speakable state, receives the multiaddress message being transmitted from the calling personal station 200a, and regenerates and outputs from the speaker 24. Thus, each operator of the called personal stations 200b, 200c and 200d can hear the multiaddress message from the calling personal station 200a.

Then, after completing the transmission of the multiaddress message, the calling personal station 200a operates (on-hook operation) to disconnect from the operation element 273, the controller 270 having recognized the on-hook operation controls the radio 220, uses the speaking slot to transmit a "disconnect" message, and disconnects the radio link for the multiaddress communication.

Figure 15:
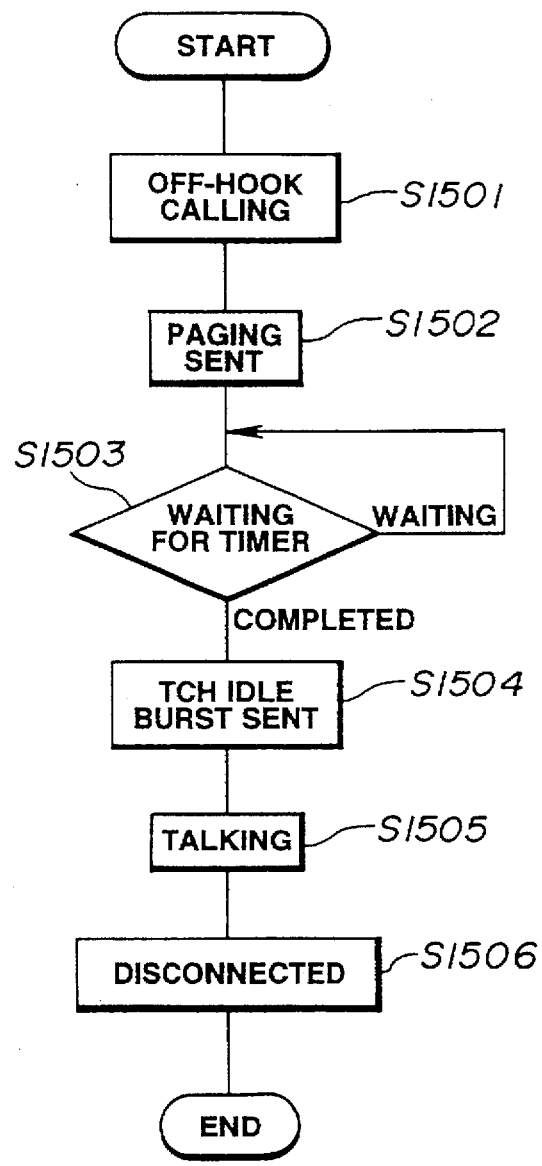
FIG. 15 is a flowchart showing the operation of a calling personal station in the broadcast address paging operation control by the system according to the invention.

The calling personal station 200a regarding the broadcast address paging control and the called personal stations 200b, 200c and 200d each are operated as follows. First, the operation of the calling personal station 200a will be described with reference to the flowchart shown in FIG. 15.

To start the broadcast address paging, the calling personal station 200a sets the transceiver mode and makes an off-hook call from the operation element 273 (step 1501), and transmits a "simultaneous paging" message (step 1502). Then, the calling personal station 200a uses the controller 270 to monitor a lapse of time which is previously set as a period before the "Tch idle burst" is transmitted (step 1503). Upon the lapse of the set time, the calling personal station 200a transmits the "Tch idle burst" (step 1504), and opens the audio speech path in the ADPCM coadic to make "speaking" by a handset (speaker 260, microphone) (step 1505). This speaking is a one-way speaking from the calling personal station 200a to a plurality of called personal stations 200b, 200c and 200d to notice the contents of the broadcast address paging. Then, the calling personal station 200a recognizes that the off-hook operation has been made on the operation element 273, and transmits a "disconnect" message to disconnect the radio link (step 1506).

Figure 16:
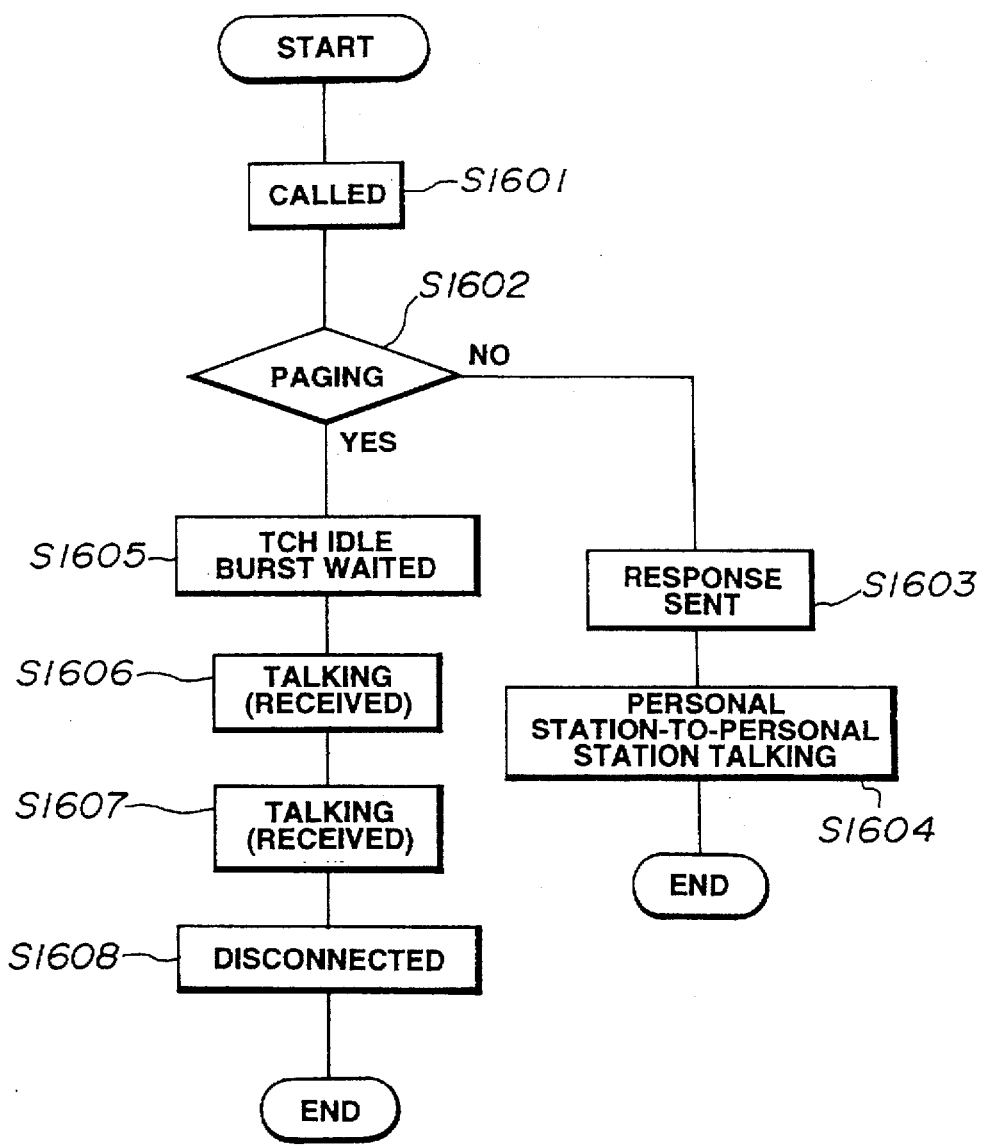
FIG. 16 is a flowchart showing the operation of a called personal station in the broadcast address paging operation control by the system according to the invention.

In contrast to the operation of the calling personal station 200a, the called personal stations 200b, 200c and 200d operate according to the flowchart shown in FIG. 16. Specifically, the called personal stations 200b, 200c and 200d having received a call from the calling personal station 200a (step 1601) judge whether the call is a simultaneous paging or not (step 1602). When this call is judged as a non-simultaneous paging (step 1602 NO), a response to the call is transmitted (step 1603), and the general personal station-to-personal station speaking is initiated (step 1604).

On the other hand, when the above call is judged as a simultaneous paging (step 1602 YES), the called personal stations 200b, 200c and 200d wait in a state waiting for "Tch idle burst" (step 1605). In this state, when the "Tch idle burst" is received (step 1606), the speaking state is initiated, and a speaking voice being transmitted succeedingly from the calling personal station 200a is received (step 1607).

Then, the called personal station 200b, 200c and 200d receive a "disconnect" message from the calling personal station 200a, and disconnects the radio link (step 1609) to complete the operation.

In connection with the aforementioned extension transfer or broadcast address paging, a conventional system is designed to use the cell station 100 to make the extension transfer or broadcast address paging, requiring to use two speaking slots, one for the uplink line to the cell station 100 and the other for the downlink line.

Figure 11:
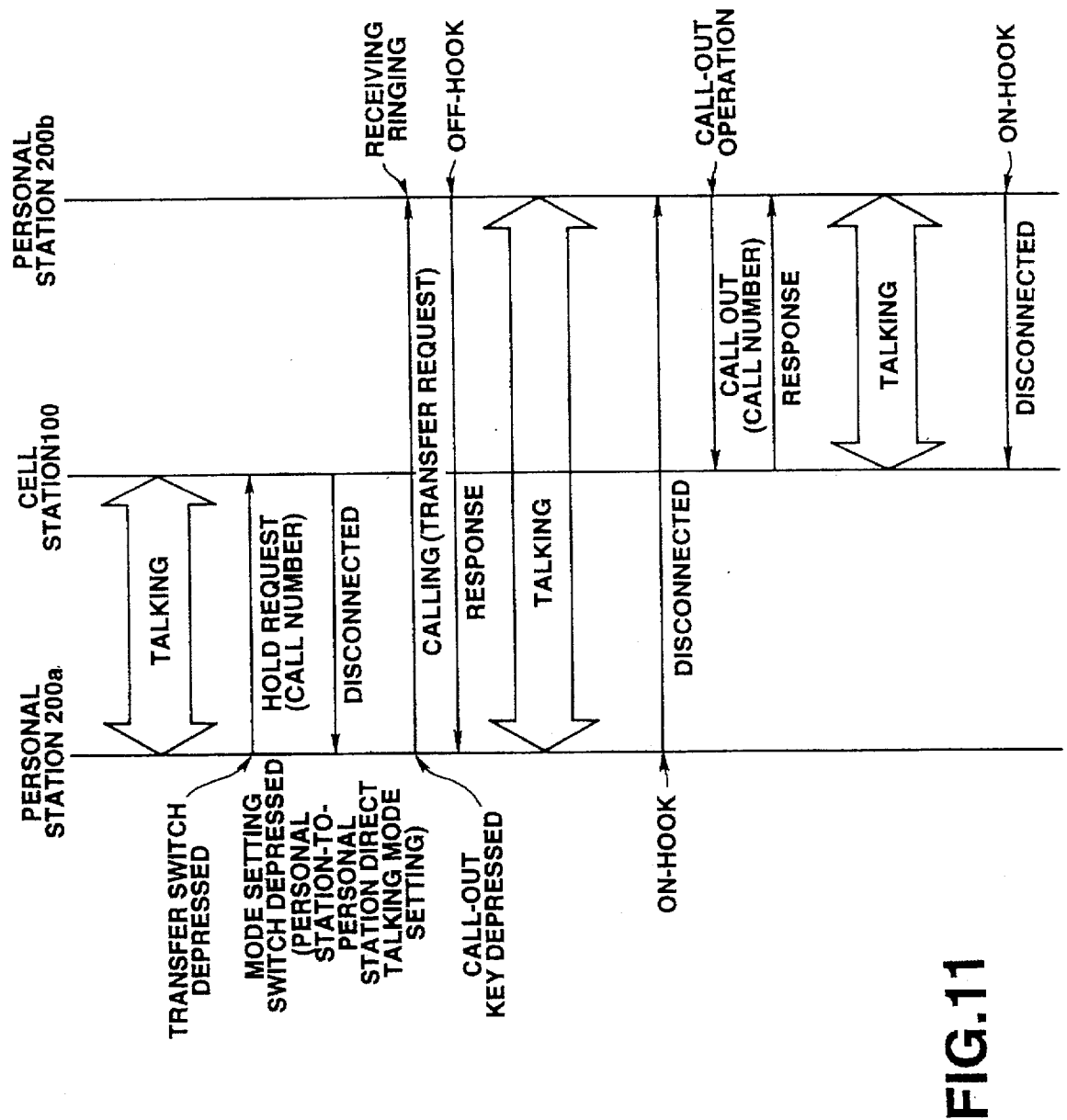
FIG. 11 is a control sequence of the extension transfer operation in the system according to the invention.
Figure 14:
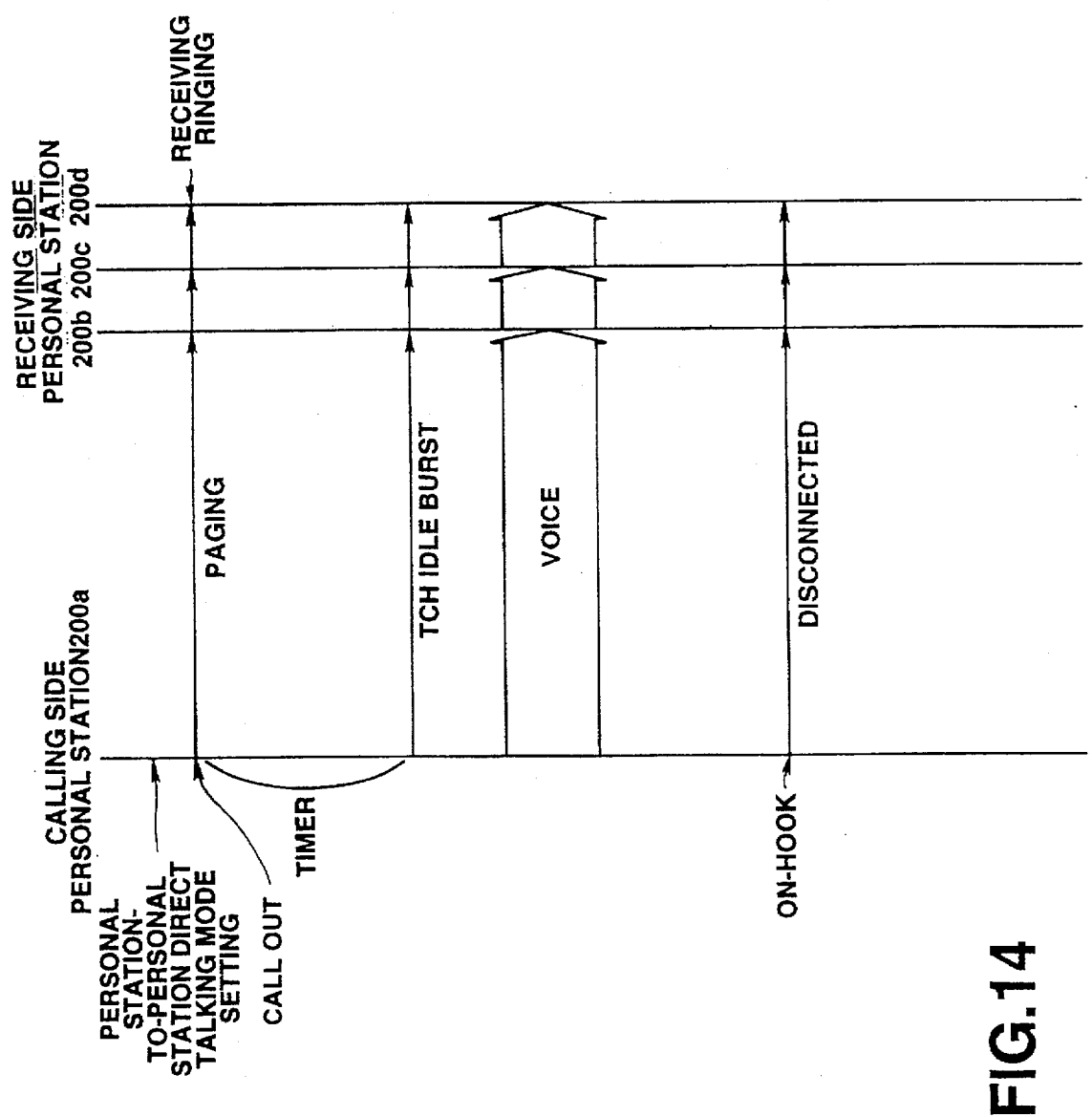
FIG. 14 is a control sequence of the broadcast address paging operation by the system according to the invention.

On the other hand, as seen from the control sequence shown in FIG. 11 or FIG. 14, the system of the invention uses the personal station-to-personal station direct communication function to perform the extension transfer or broadcast address paging, so that the occupation of the two communication slots for uplink and downlink involving the presence of the cell station can be eliminated, and only one speaking slot can be used to effect the extension transfer function or broadcast address paging function.

Therefore, in the structural condition that the cell station 100 has four communication slots for one radio, even when three slots are being used by three personal stations which are busy, the remaining one slot can be used to make the extension transfer or broadcast address paging. Thus, the efficiency of using the communication slots can be enhanced, the number of accommodatable personal stations for each radio can be increased, and service for the extension transfer function or broadcast address paging function can be improved.

What is claimed is:

1. A mobile station in a digital mobile communication system having a master-slave mode to communicate with a cell station through a radio link and a mobile station-to-mobile station direct communication mode to directly communicate with another mobile station through a radio link, the mobile station comprising:

judging means for determining whether the another mobile station is busy and in communication with another device based on whether there is a reception of either one of a plurality of time division multiplex access (TDMA) frame signals being transmitted from the cell station for communication in the master-slave mode, and one of a plurality of TDMA frame signals being transmitted from the another mobile station for communication in the mobile station-to-mobile station direct communication mode; and communication slot determination means for determining, when the judging means judges that the another mobile station is busy, a communication slot to be used for a called mobile station by detecting an idle communication slot on a TDMA signal frame of the busy station after establishing frame-synchronization between a timing of a TDMA signal frame of the mobile station and the TDMA signal frame of the busy station that is being received in the judging means and, when the judging means judges that the busy station does not exist, generates a timing of the TDMA signal frame at the mobile station and determines the communication slot on the TDMA signal frame of the mobile station, that is to be used for the called mobile station.

2. The system according to claim 1, wherein the communication slot determination means comprises:

signal extraction means for extracting a specific signal from among the signals transmitted from the busy station;

synchronization establishment means for recognizing the timing of the TDMA signal frame of the busy station in view of a position of the specific signal extracted by the signal extraction means; and communication slot selection means for selecting an unused communication slot in the mobile station's TDMA signal frame after the above synchronization establishment.

3. The system according to claim 2, wherein the signal extraction means includes unique word detection means for detecting a unique word in a signal being transmitted from a communication slot by the busy station.

4. The system according to claim 3, wherein the synchronization establishment means includes:

receiving frame recognition means for determining a timing of a receiving slot including the unique word from a position of the unique word detected by the unique word detection means and recognizes a header portion of the receiving frame based on the determined timing; and timing adjustment means for adjusting a timing of the frame so that a slot and a timing of the mobile station's TDMA signal frame agree with a slot and a frame of the receiving frame.

5. In a digital mobile communication system employing a time division multiple access (TDMA) method, which comprises a plurality of cell stations and a plurality of mobile stations communicating with the cell stations and which has a master-slave communication mode to communicate between the cell stations and the mobile stations by making the respective mobile stations subordinately synchronized with TDMA frames that the respective cell stations generate and by using an arbitrary communication slot in the frame, and a mobile station-to-mobile station direct communication mode to directly communicate between a calling side mobile station and a called side mobile station with the use of a communication slot determined at the calling side mobile station, after making the called side mobile station subordinately synchronized with the TDMA frame of the calling side mobile station by generating the TDMA frame by the calling side mobile station, determining an arbitrary communication slot from the generated frame and directly issuing a call to the called side mobile station, an extension transferring method comprising the steps of:

notifying, at a first mobile station, one of the cell stations of a hold request added with a hold call number in response to an operation for holding a call being in communication through the one cell station and an input of the hold call number for identifying the call to be held;

holding, at the cell station, the call being in communication with the first mobile station and disconnecting a radio link with the first mobile station, in response to notification of a hold request message from the first mobile station;

notifying, at the first mobile station, the hold call number by originating a call in the mobile station-to-mobile station direct communication mode to a second mobile station to which the call is to be transferred, after the radio link with the one cell station is disconnected;

hold call number step of originating, at the second mobile station, a call to the one cell station with the hold call number added after receiving the notification of the hold call number from the first mobile station in the mobile station-to-mobile station direct communication mode; and collating, at the cell station, the hold call number and the hold call number notified from the first mobile station by accepting an incoming call added with the hold call number from the second mobile station, and connecting the held call to the second mobile station when both of the hold call numbers agree with each other.

6. The method according to claim 5, wherein the notifying step includes the step of transmitting the hold call number entered through an input operation section of the first mobile station to the second mobile station, and the hold call number step includes the steps of:

storing the hold call number transmitted from the first mobile station; and reading and automatically transmitting the stored hold call number when calling the one cell station.

7. The method according to claim 6, further comprising the step of displaying the stored hold call number in the second mobile station.

8. The method according to claim 5, wherein the notifying step comprises the substep of notifying the hold call number from the first mobile station to the second mobile station, and the hold call number step comprises the substep of calling by manually entering the notified hold call number.

9. In a digital mobile communication system employing a time division multiple access (TDMA) method, which comprises a plurality of cell stations and a plurality of mobile stations communicating with the cell stations and which has a master-slave communication mode to communicate between the cell stations and the mobile stations by making the respective mobile stations subordinately synchronized with TDMA frames that the respective cell stations generate and by using an arbitrary communication slot in the frame, and a mobile station-to-mobile station direct communication mode to directly communicate between a calling side mobile station and a called side mobile station with the use of a communication slot determined at the calling side mobile station, after making the called side mobile station subordinately synchronized with the TDMA frame of the calling side mobile station by generating the TDMA frame by the calling side mobile station, determining the arbitrary communication slot from the generated frame and directly calling the called side mobile station, a broadcast address paging method comprising the steps of:

originating, at a first mobile station, a call in the mobile station-to-mobile station direct communication mode based on a predetermined simultaneous paging originating operation and sending a simultaneous paging message to all other mobile stations that are to be simultaneously paged;

sending, at the first mobile station, a broadcast message after sending the simultaneous paging message;

waiting, at the other mobile stations, in a state capable of communicating with the first mobile station for reception of the simultaneous paging message; and receiving, at the other mobile stations, the broadcast message sent from the first mobile station waiting for reception and reproducing the received message, wherein the broadcast address paging is carried out from the first mobile station to the other mobile stations by using the mobile station-to-mobile station direct communication mode.

* * * * *